Figure 1:
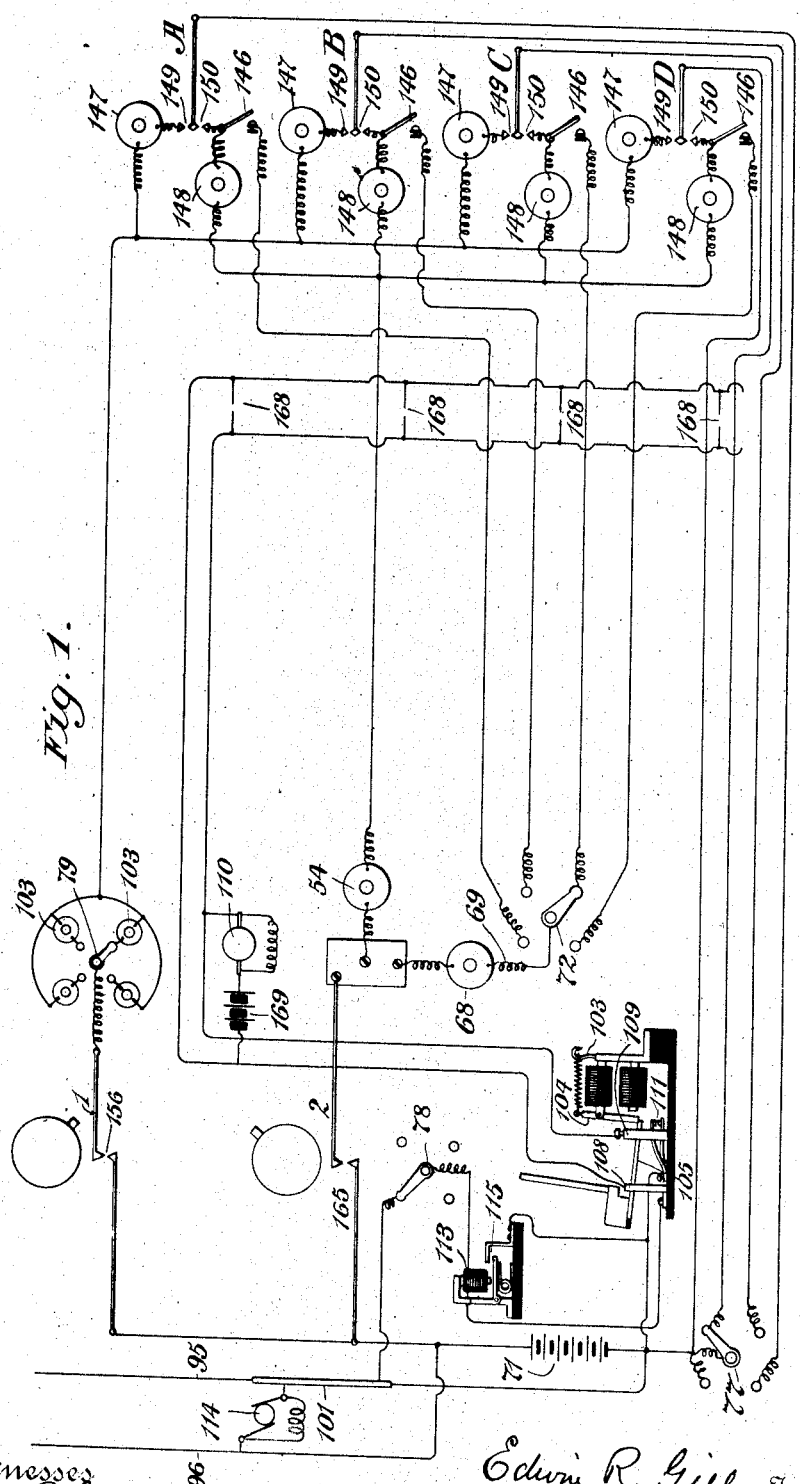

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 1.

Witnesses
Edward Bowlgus.
Florence Pick.

Edwin R. Gill, Inventor
By his Attorney H. S. MacKaye

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 2.

Witnesses
Edward Rowland
Florence Pick

Edwin R. Gill
Inventor

By his Attorney H. S. MacKay

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 3.

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 4.

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 5.

Witnesses
Edward Rowland
Florence Pick

Edwin R. Gill
Inventor

By his Attorney H. S. MacKaye

No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 6.
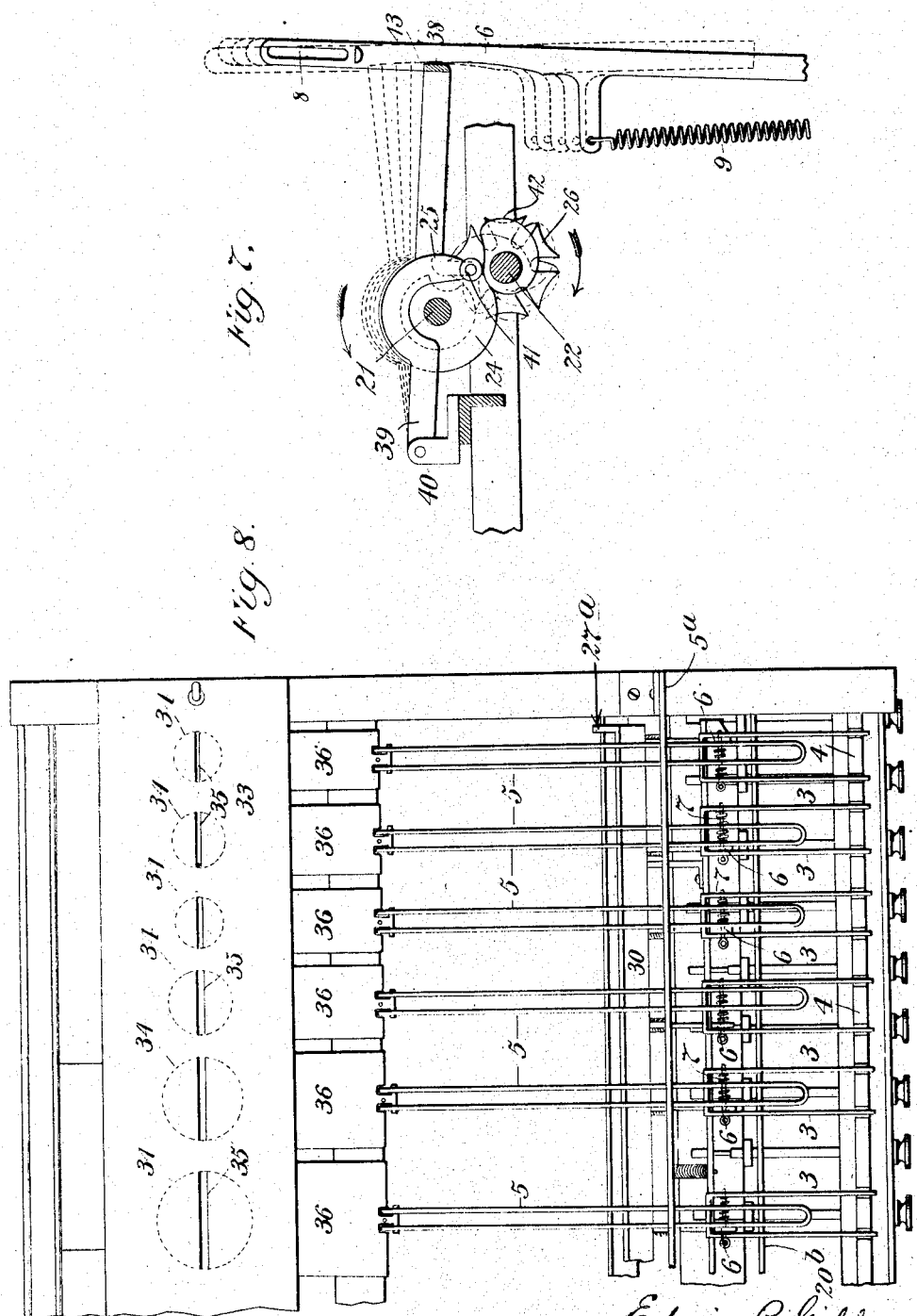

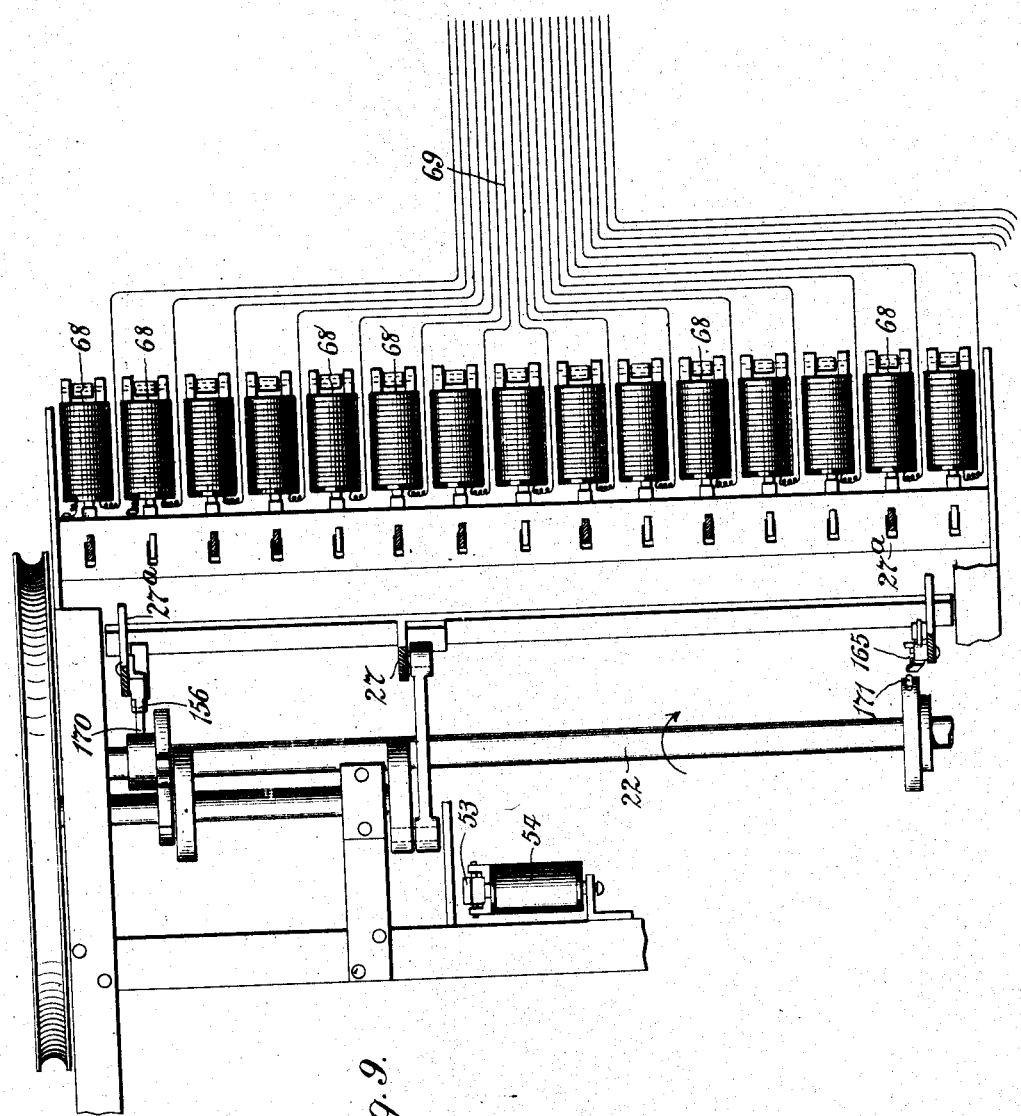

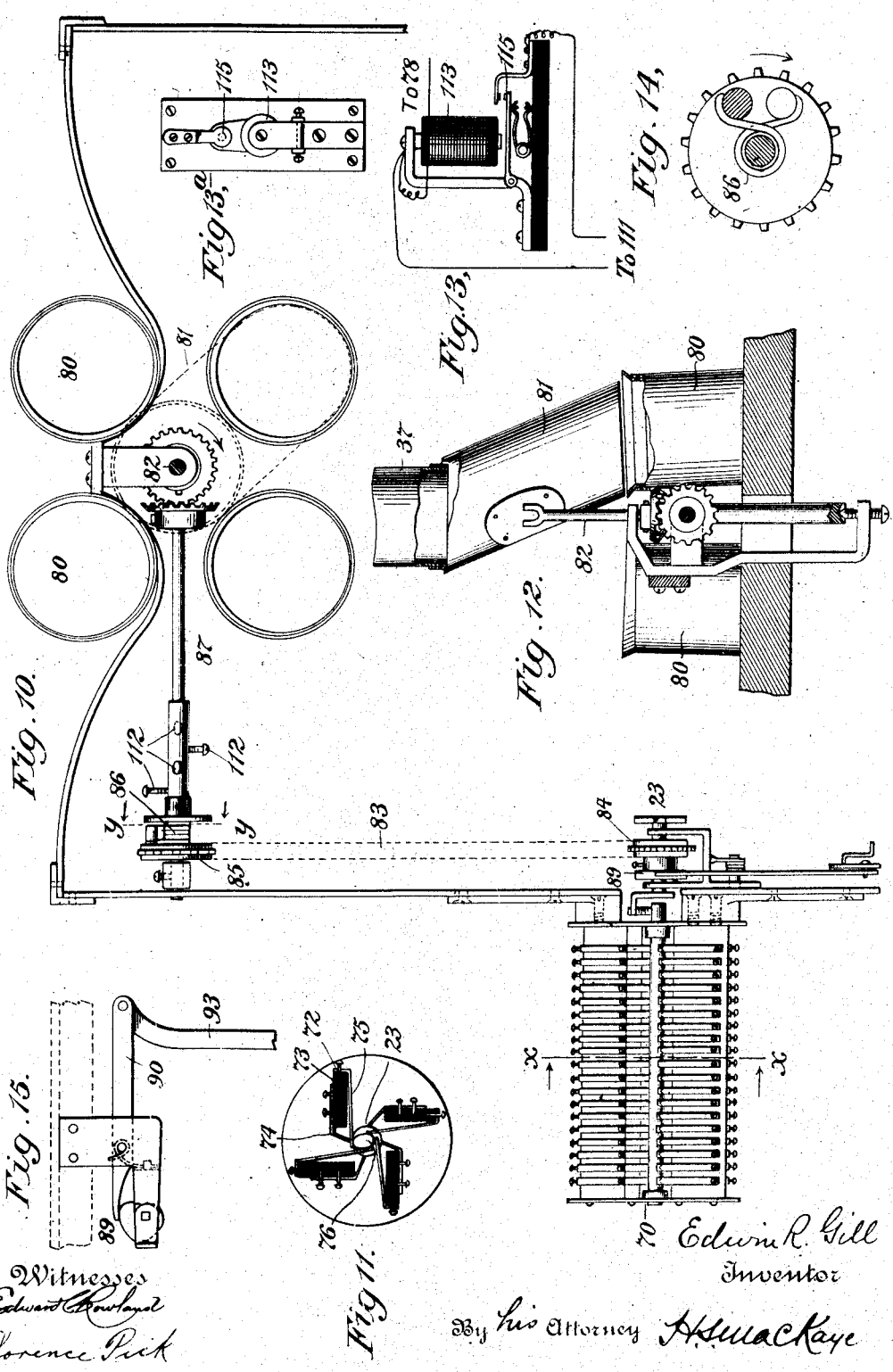

No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 9.
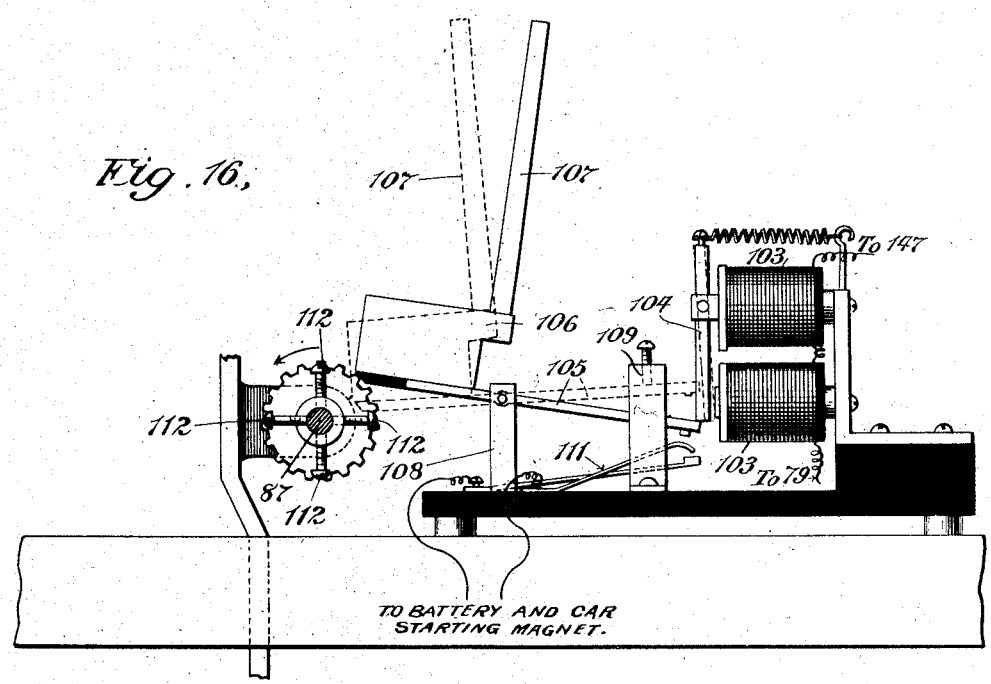
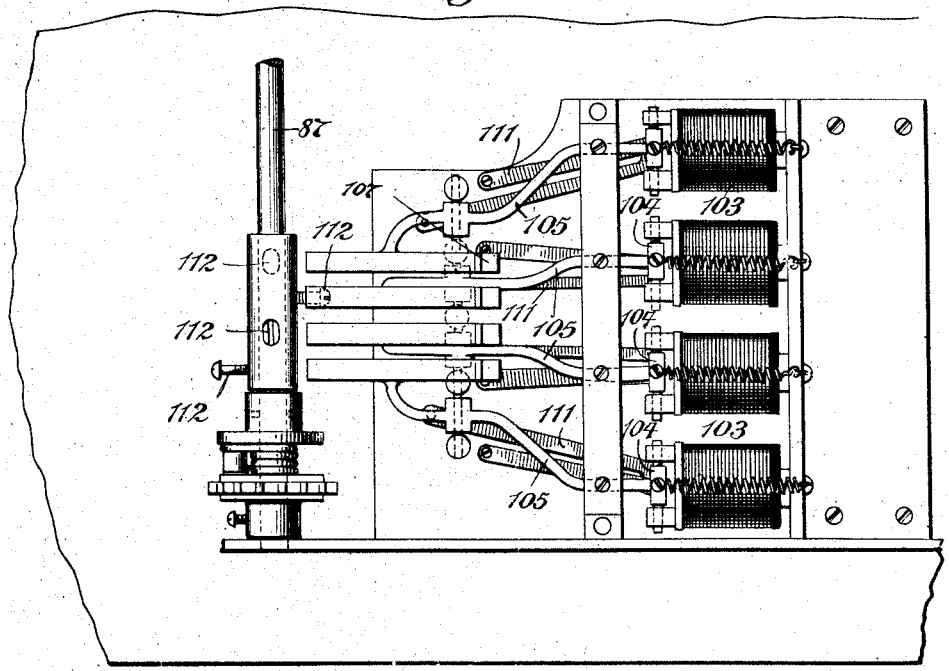

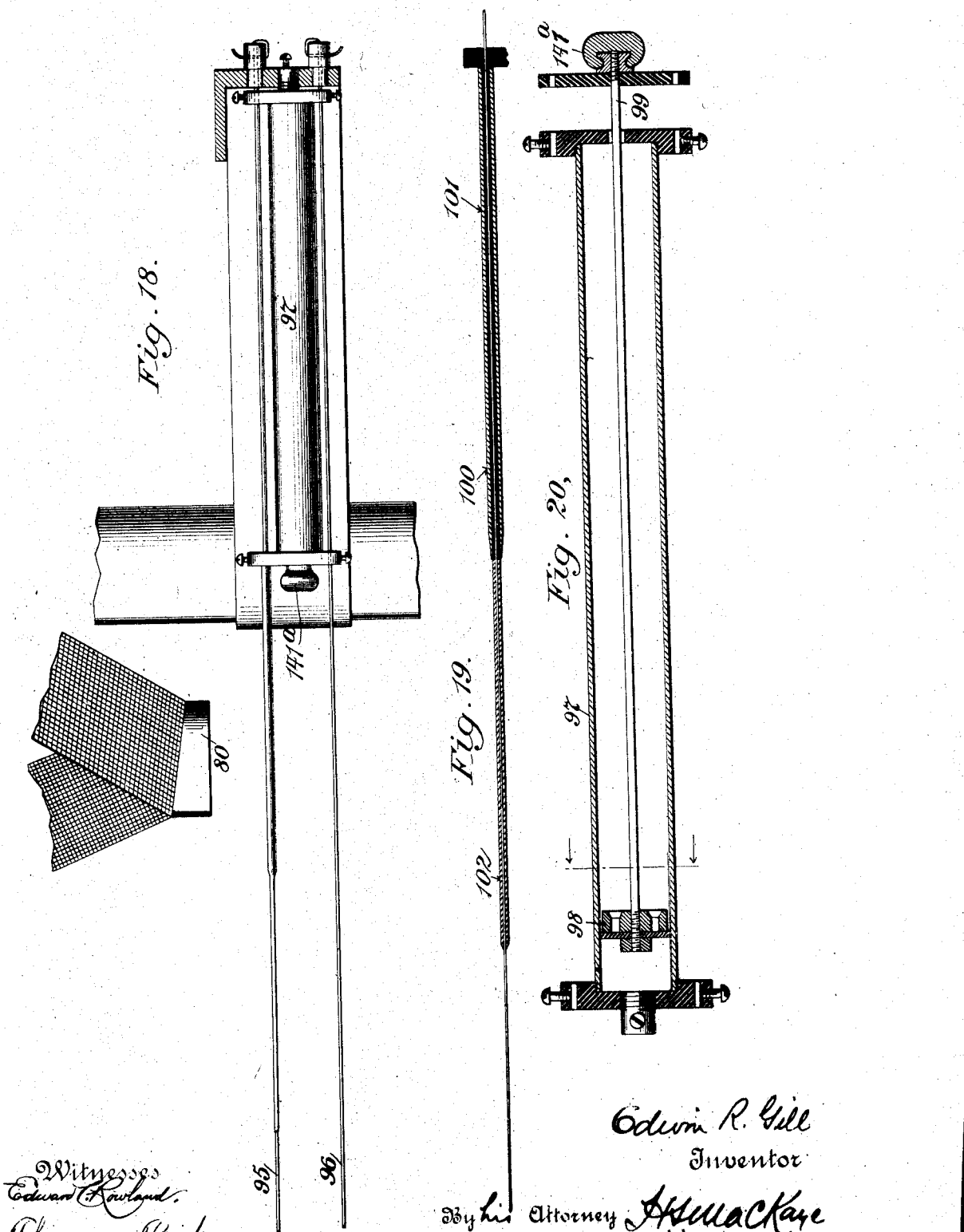

No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 11.
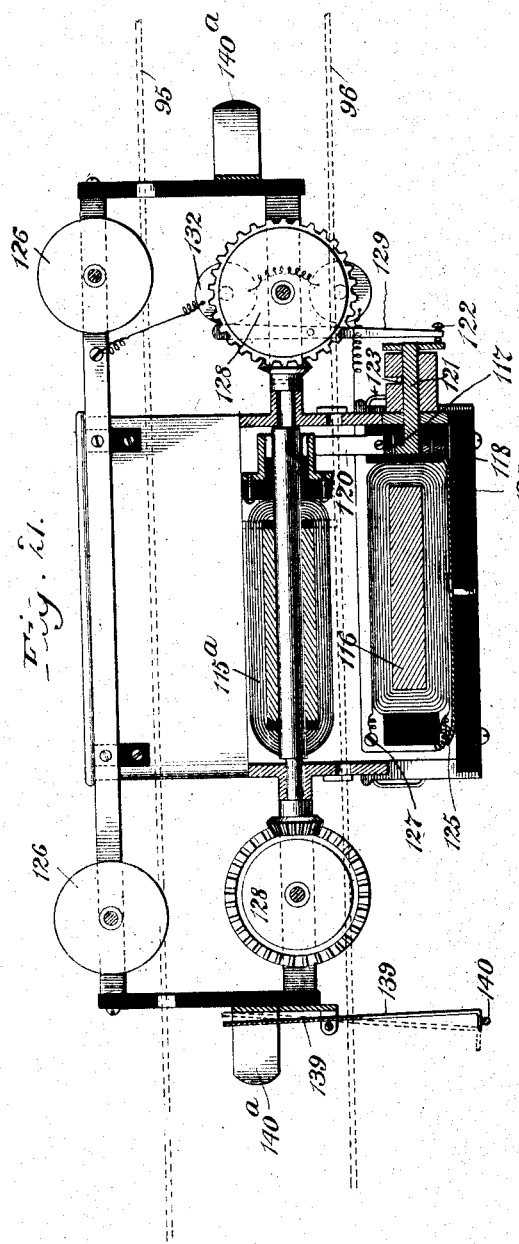
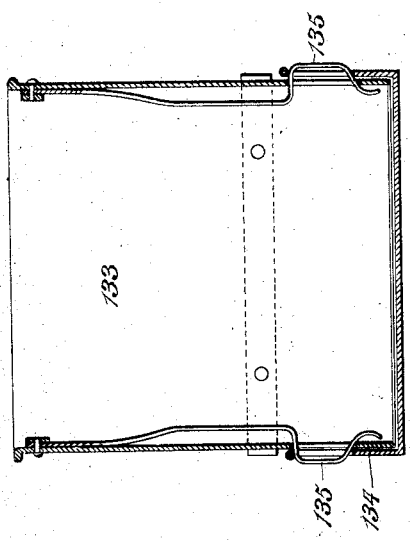
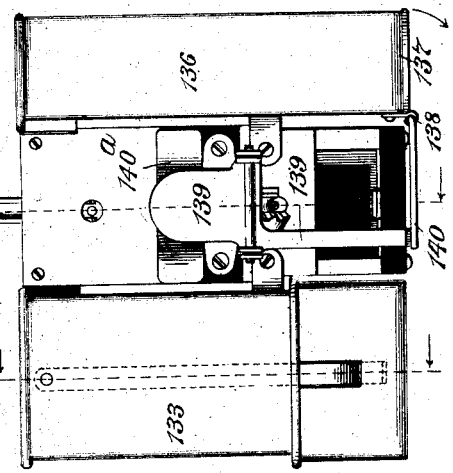
Edwin R. Gill
Inventor No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 12.
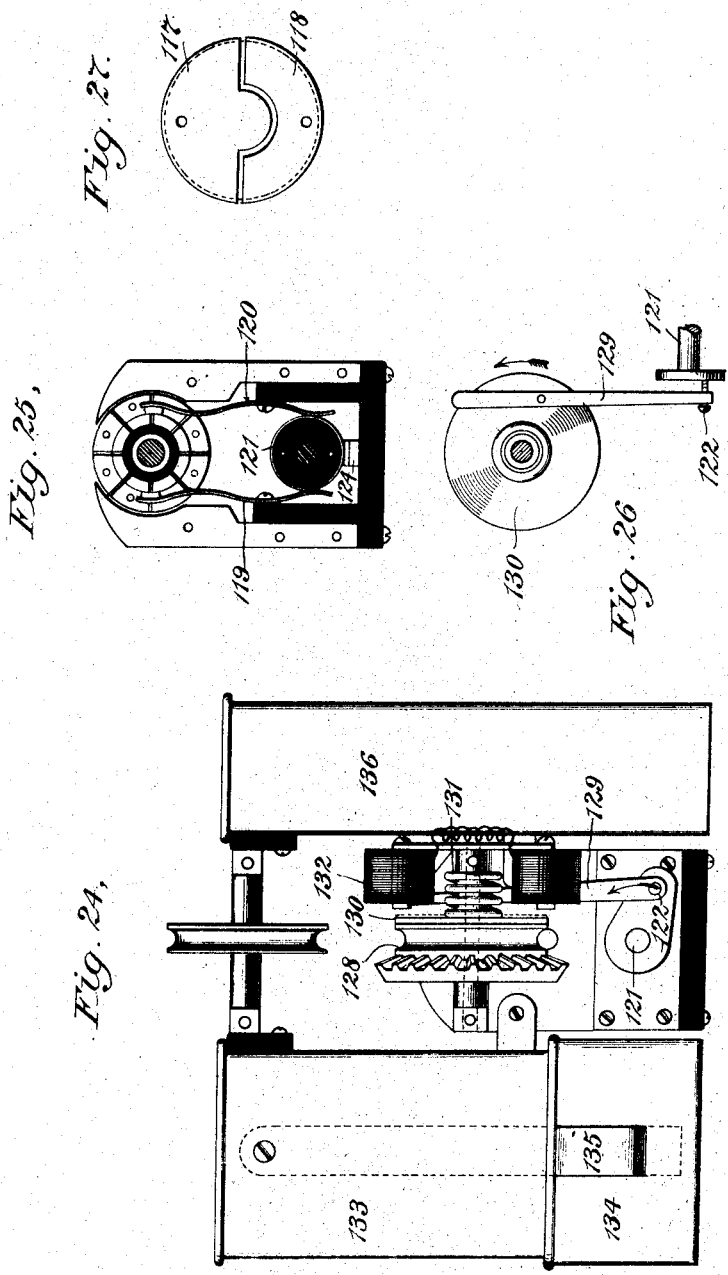

No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 13.
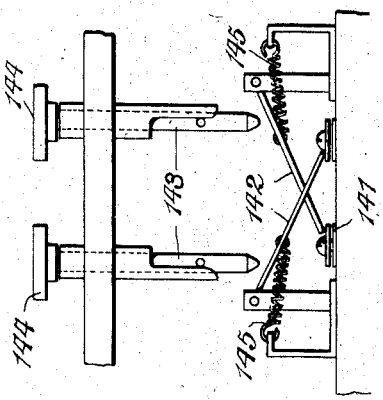
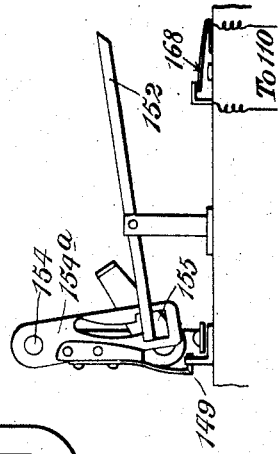
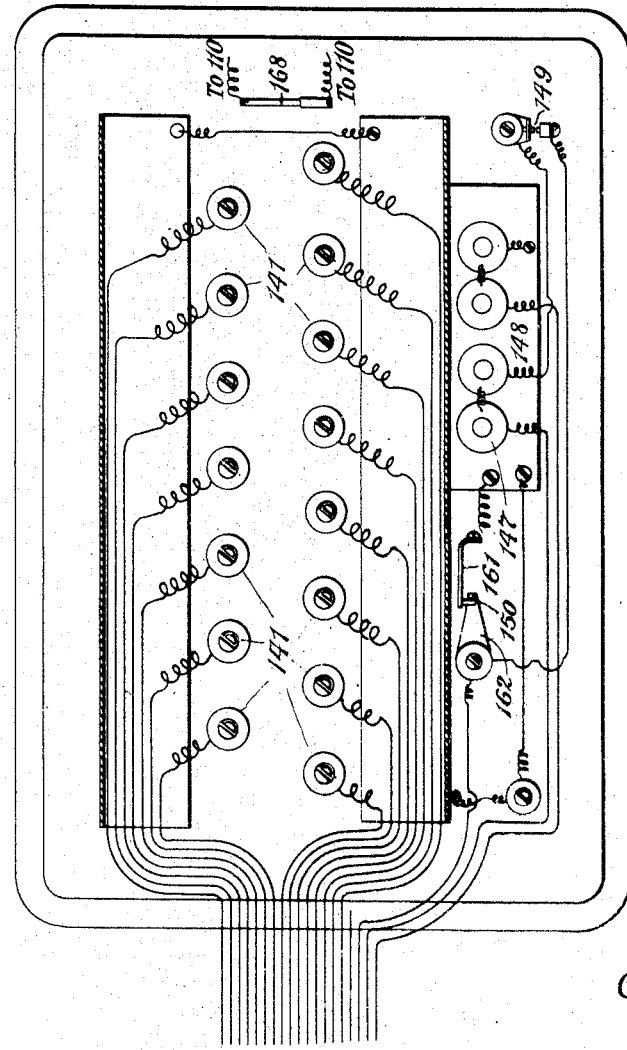
Witnesses
Edward C Rowland
Florence Pick
Edwin R. Gill
Inventor
By his Attorney H S MacKay No. 881,854. PATENTED MAR. 10, 1908.
E. R. GILL.
CHANGE MAKER.
APPLICATION FILED AUG. 14, 1903. RENEWED JULY 2, 1907.
16 SHEETS—SHEET 14.
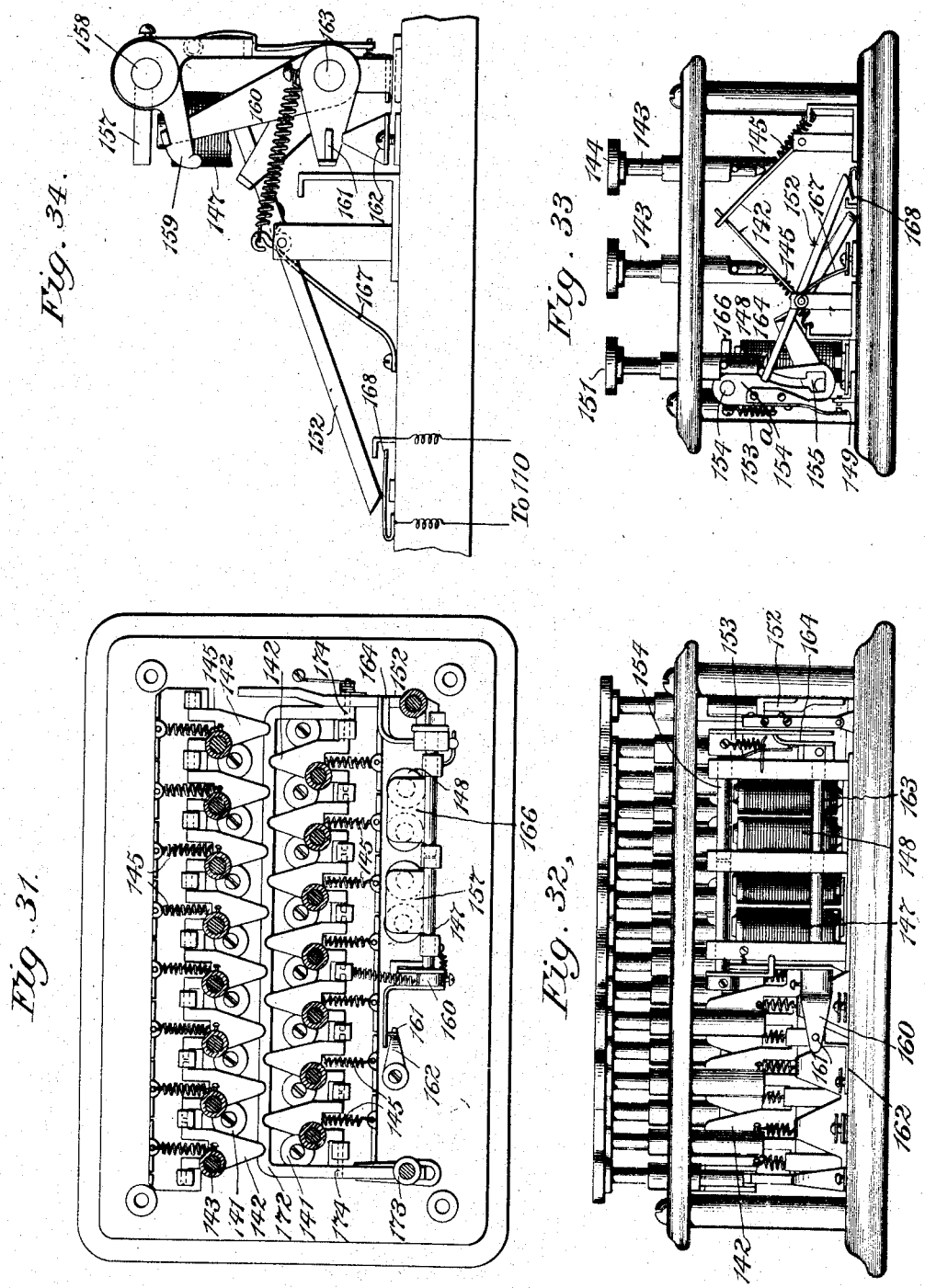

No. 881,854. PATENTED MAR. 10, 1908.
E. R. GILL.
CHANGE MAKER.
APPLICATION FILED AUG. 14, 1903. RENEWED JULY 2, 1907.

16 SHEETS—SHEET 15.

Witnesses
Edward Rowland
Florence Pick

Edwin R. Gill
Inventor
By his Attorney H. S. Mackaye

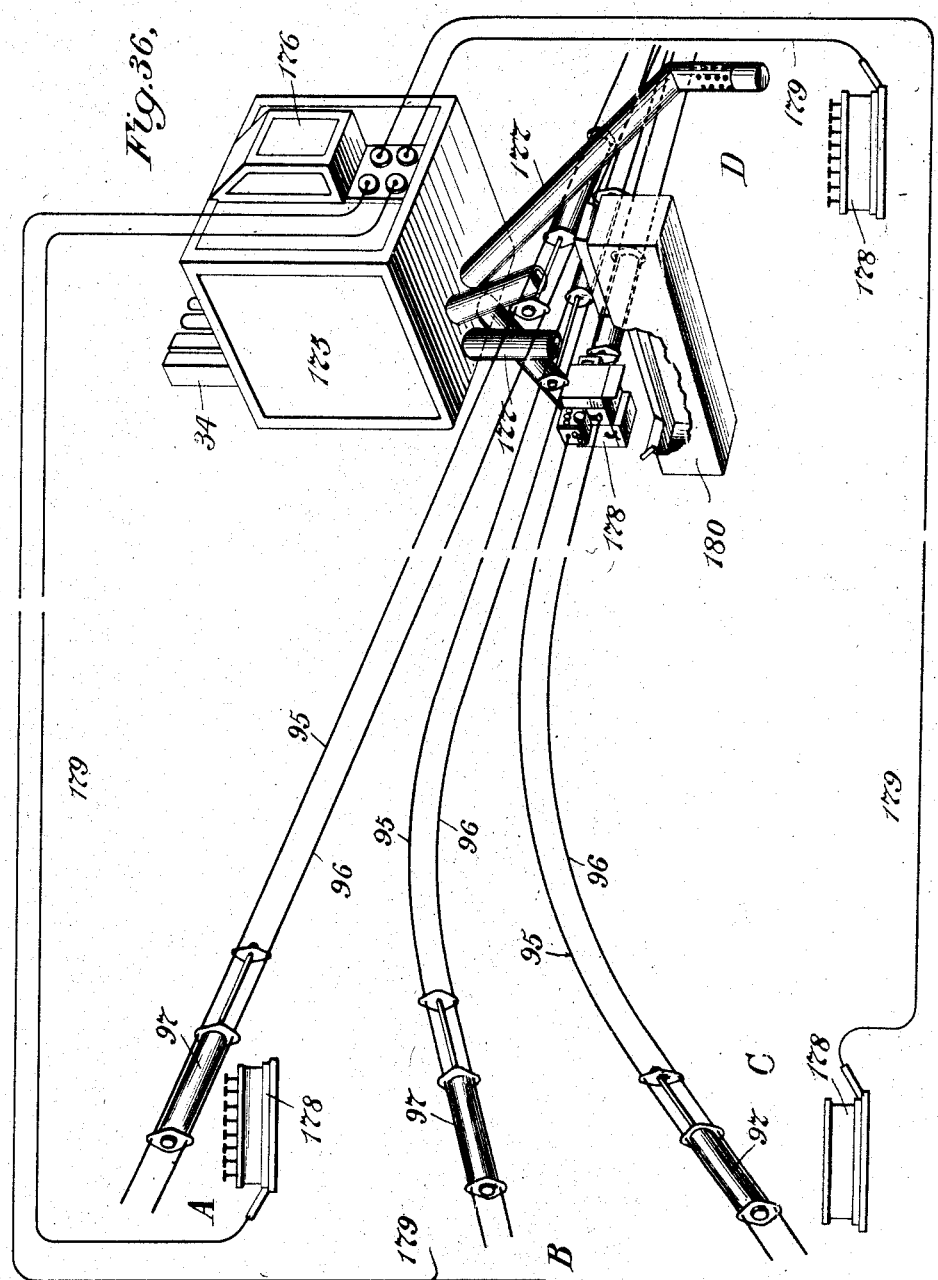

UNITED STATES PATENT OFFICE.

EDWIN R. GILL, OF YONKERS, NEW YORK, ASSIGNOR TO ELECTRIC CASH CARRIER AND CHANGE MAKER COMPANY, A CORPORATION OF MISSOURI.

CHANGE-MAKER.

No. 881,854.  Specification of Letters Patent.  Patented March 10, 1908.

Original application filed July 26, 1895, Serial No. 557,182. Patented April 26, 1904, No. 758,060. Divided and this application filed August 14, 1903. Serial No. 169,481. Renewed July 2, 1907. Serial No. 381,926.

*To all whom it may concern:*

Be it known that I, EDWIN R. GILL, a citizen of the United States, residing in Yonkers, in the county of Westchester and State of New York, have invented a certain new and useful Improvement in Change-Makers, of which the following is a specification, reference being had to the accompanying drawings, forming a part of the said specification.

This is a division of my Patent No. 758,060 dated April 26, 1904 which has relation to a form of store service apparatus combining the functions of a cash carrier, a change maker and a cash register. The change maker is herein particularly claimed.

One object of my invention is to provide an apparatus which shall enable each salesman in a store to speedily and conveniently make change and deposit payments, the cash being at the same time kept in a central receptacle in communication with a number of salesmen. By the use of my invention these advantages are attained without the employment of a cashier at the point of receipt of payments.

Another object of my invention is the providing of apparatus whereby a mechanism may be operated to count out any desired quantity of change, and at the same time make a record of the amount and destination thereof.

My invention as preferably used is illustrated in the accompanying drawings, wherein—

Figure 2:
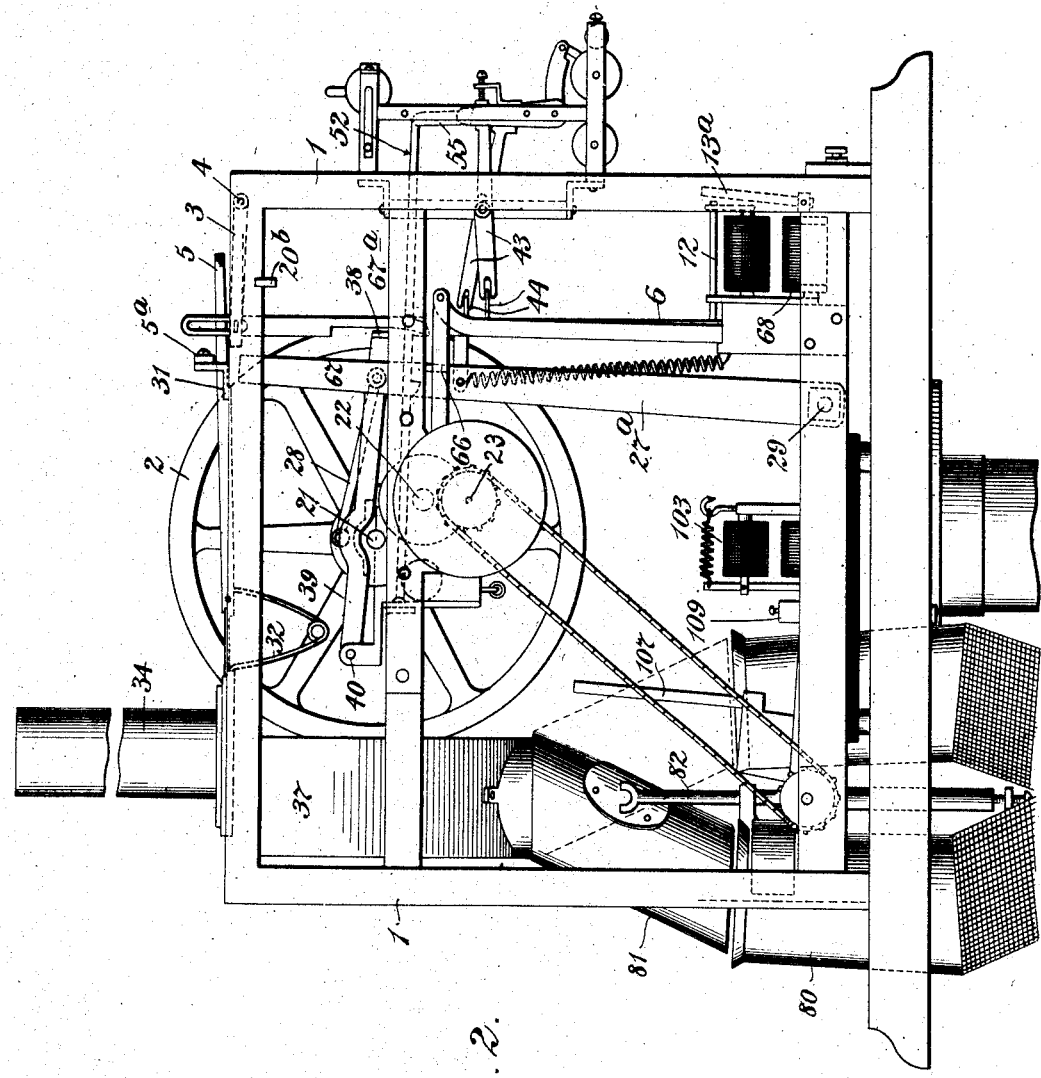
Figure 3:
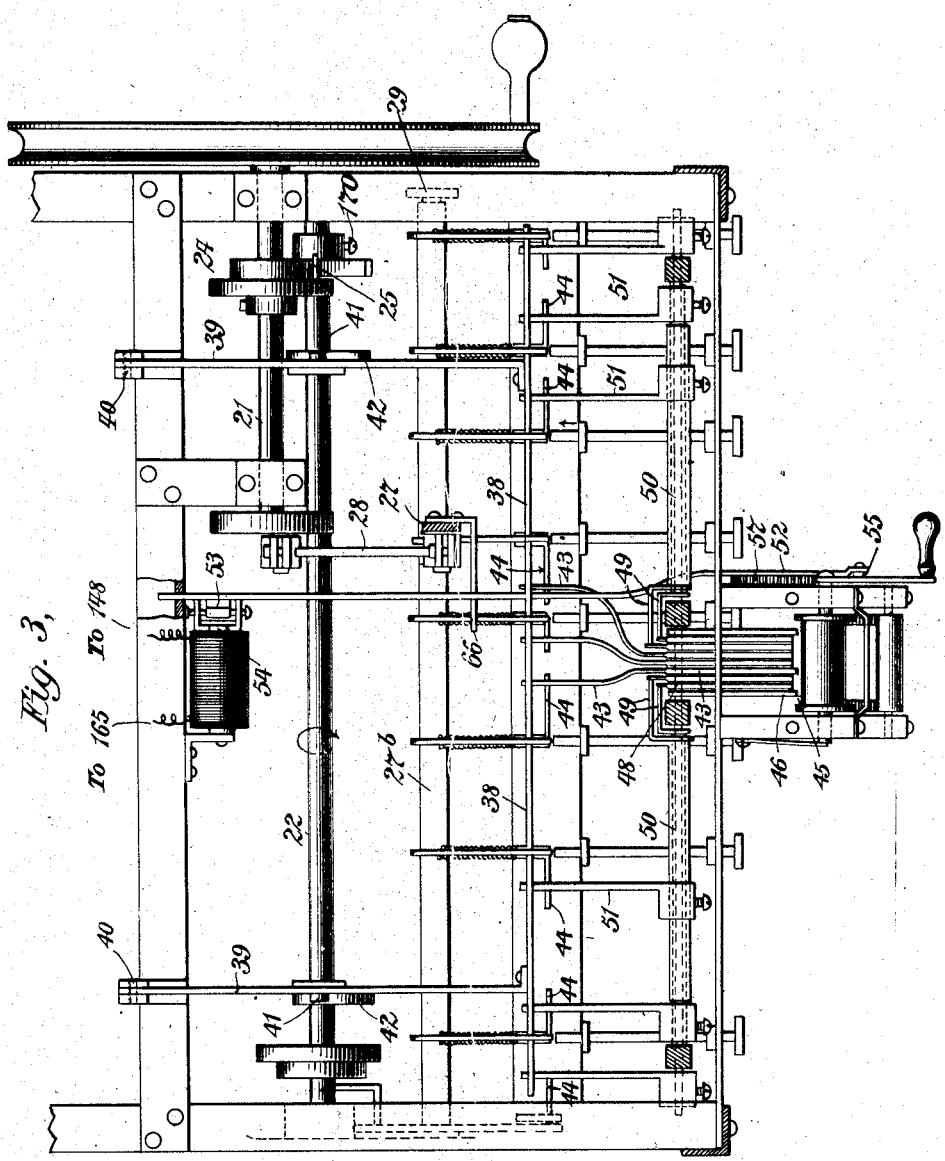
Figure 4:
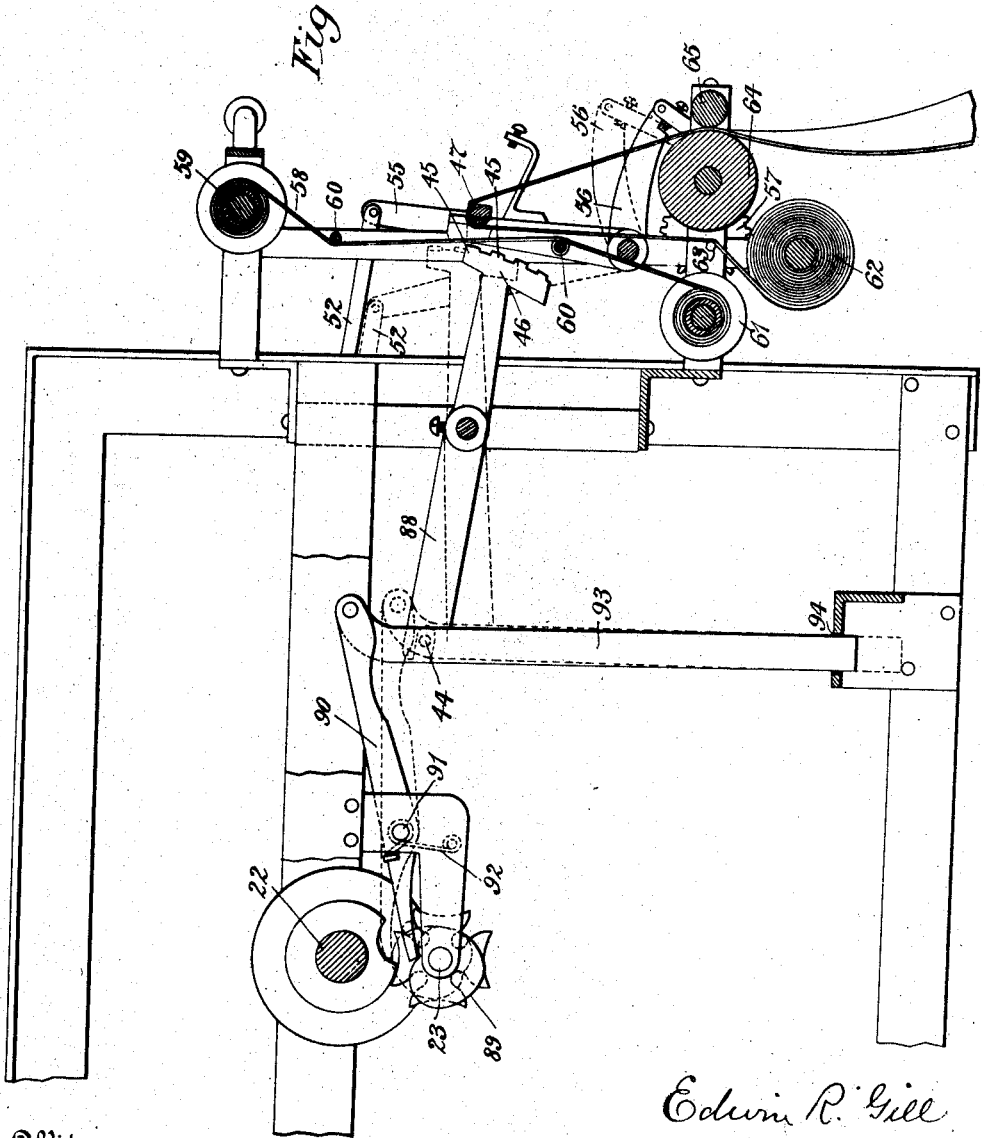
Figure 5:
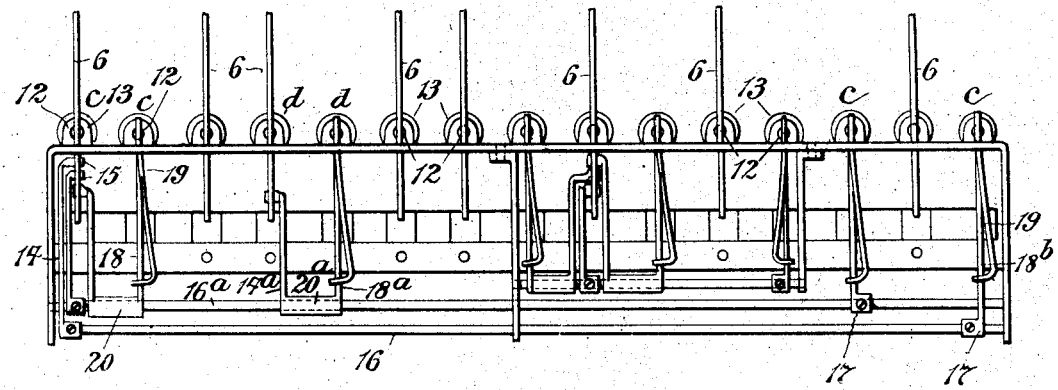
Figure 6:
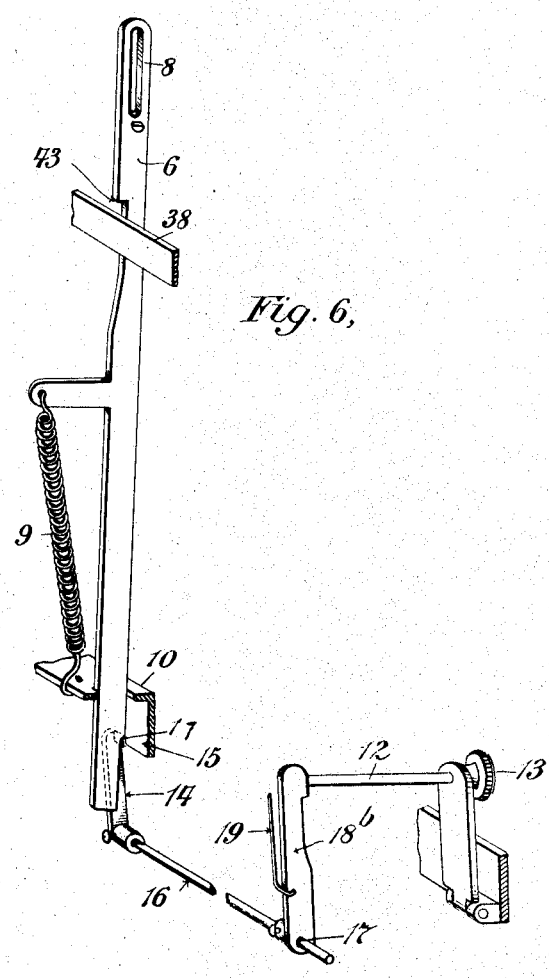
Figure 35:
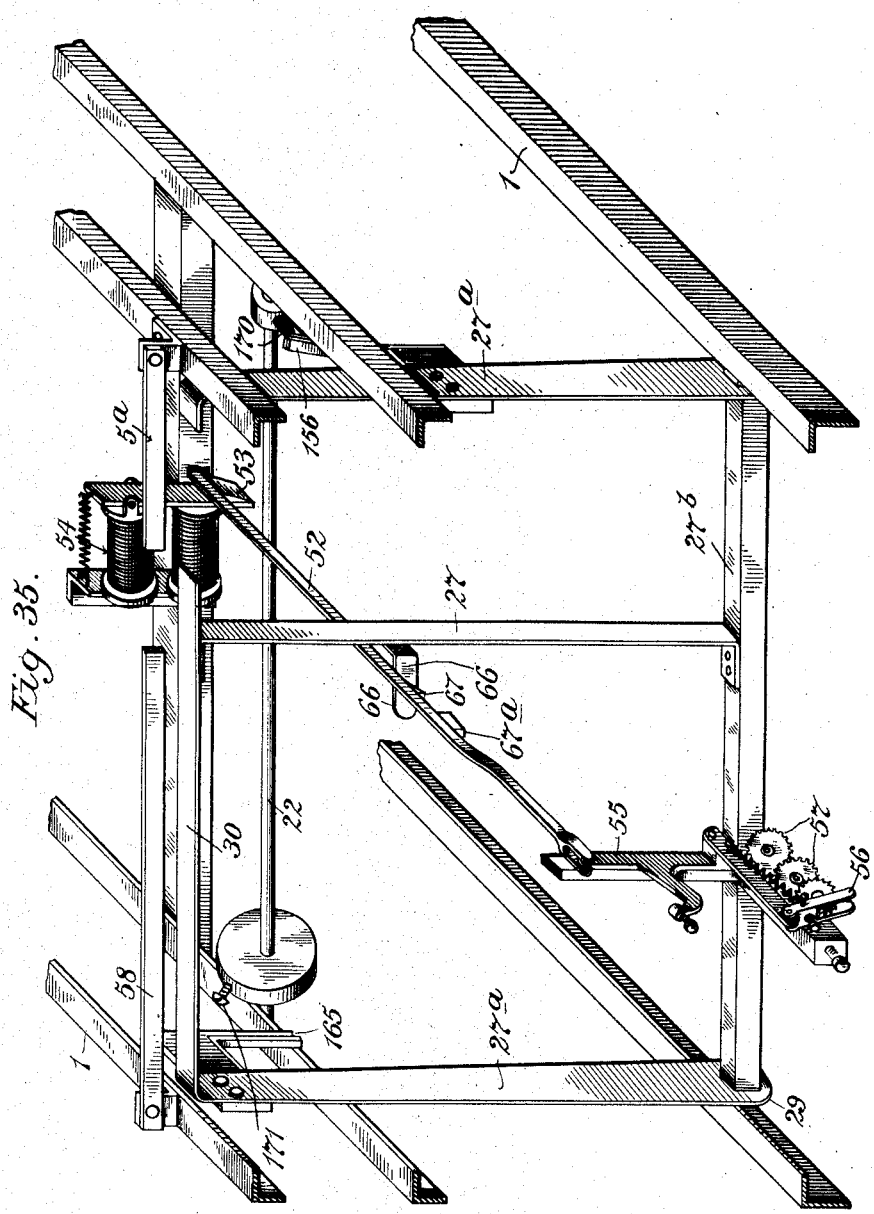

Figure 1 is a diagram exhibiting my preferred arrangement of electrical circuits for connecting and controlling the relative movements of the various parts of my store service apparatus, when the same is constructed to operate electrically. Fig. 2 is a side view of the change maker and recorder preferably employed by me at the central station or point of deposit of the cash when received, certain details being omitted for clearness, which are elsewhere clearly illustrated. Fig. 3 is a top view of what is shown in Fig. 2, the actual change expelling mechanism being omitted for clearness of disclosure of parts beneath it, and illustrating my preferred change maker and recorder as adapted to hand manipulation. Fig. 4 is a detail side view of my recorder, showing its connection with that portion of the central station instrument which acts as an order selector in a manner hereinafter described, certain portions being shown in vertical section. Fig. 5 is a rear elevation of the lower portion of the change selector. Fig. 6 is a perspective view of one element of my change selector adapted to hand manipulation, and showing a preferred means whereby the degree of depression of the drop bars may be controlled. Fig. 7 illustrates a preferred mechanism for restoring the drop bars to their normal position, after operation of the machine, and makes clear the step by step action of this form of restoring mechanism. Fig. 8 is a top plan view of the horizontally working portion of my change selector and deliverer, showing the mode of connection between the lifting levers and the drop bars. Fig. 9 illustrates a preferred arrangement of money magnets, and the mode of applying said magnets to the operation of the drop bars. Fig. 10 is a top view of my change distributer and order selector, isolated from the remainder of the central machine, and showing one means for insuring their simultaneous operation. Fig. 11 is a sectional detail of one of the elements of my preferred order selector taken on the line $x$—$x$ of Fig. 10. Fig. 12 is a side view of a portion of a preferred form of change distributer. Fig. 13 shows a preferred form of car starting magnet in side elevation; Fig. 13$^a$ showing the same in plan and in its preferred location with respect to the parts shown in Fig. 10 on the same sheet. Fig. 14 is a sectional view of the form of power transmitting mechanism which I prefer to employ for actuating the change distributer, and is taken on the line $y$—$y$ of Fig. 10. Fig. 15 is a detail side view of a portion of my station-type selector, also seen in Fig. 4. Fig. 16 is a side view of what I term my maintaining switch, showing its relation to the starting switch for the cash carrier car, when the change maker and cash carrier are combined, which is my preferred construction. Fig. 17 is a top view of a number of these maintaining switches as employed at a central instrument supplying four salesmen, and showing in detail one means for automatically opening said maintaining switch at the proper time. Fig. 18 is a side view of one end of the cash carrier track, showing its relation to the point of delivery of change after passing through the change distributer. Fig. 19 is a sectional view of a preferred means for stopping and starting the cash carrier cars. Fig. 20 is a sectional view of a preferred form of buffer employed at a track terminal. Fig. 21 is a sectional view of a preferred form of cash carrying car. Fig. 22 is an end view of the same, showing the payment depositor. Fig. 23 is a sectional view of the change receptacle. Fig. 24 is an end view of the cash carrying car seen from the end opposite to that which is shown in Fig. 22, and showing the cash and change receptacle in the opposite position to that shown in Fig. 22, in relation to the driving mechanism. Fig. 25 is an end view of the car motor, showing the relative positions of the reversing switch and motor brushes as preferably used by me. Figs. 26 and 27 are detail views of the circuit reversing devices on the cash carrying car. Fig. 28 is a sectional plan view of my preferred form of electrical selecting operator, exhibiting the electric connections there employed, and also showing the order setting device in part, together with its electrical circuits, so far as they are found connected with my preferred form of salesman's instrument. Fig. 29 is an elevation of two money keys as preferably used in my selecting operator. Fig. 30 is an elevation of a detail in the order setting device. Fig. 31 is a horizontal section through my preferred selecting operator, showing its preferred position with relation to the order setting device. Fig. 32 is a side elevation of the same. Fig. 33 is an end elevation of the same, showing the same end of the order setting device as is shown in Fig. 30. Fig. 34 is an elevation of the other end of the order setting device. Fig. 35 is a perspective view of the record bar and magnet, together with the motor frame and certain closely related parts—and Fig. 36 is a small scale perspective of the general aspect of a store equipment for four stations, arranged in accordance with my preferred form of invention.

It is to be understood that my invention is of a pioneer character in several aspects to be hereinafter more fully explained and set forth in my claims; and in its broadest aspects my invention contemplates the association of certain elements adapted to a certain organic relation of functions or duties without regard to the specific form given to such elements, or to the specific motor power employed. It is to be understood therefore, that many of the agencies which I describe hereinafter as depending upon electrical action for their operation, may nevertheless be otherwise arranged or otherwise actuated than as by me described in detail, without affecting the broad aspect of my invention; so long as the various agencies broadly claimed bear that relation to each other's action and duty which is called for by the terms of any particular claim or claims.

Analyzing my invention as a whole, it will be found that it is primarily composed, when all its novel elements are present, of four principal agencies:—namely, the preparing devices;—the change maker;—the recorder; and the cash carrier. The instrumentalities comprised in each of these groups are not necessarily associated closely in space, and in some instances a portion of the elements in one group will be found closely associated, both in position and function, with the elements of another group. As a general proposition it is true, however, that the preparing device is principally under the direct control of the salesman; that the change maker and recorder, or either of these, is located at the central money depositing station, as preferably used; while the cash carrier acts as a means of communication between the salesman and the change maker.

For the purposes of this case it will be convenient to commence the description of my invention with the change maker proper, and incidentally with the recorder, usually and preferably closely associated therewith. The other main elements are afterward described to better illustrate the usefulness of the devices herein claimed.

In Fig. 2 is shown a partial side view of the combined change maker and recorder, mounted in a frame 1. The change maker proper comprises a change selector; an order selector; a change deliverer; a change distributer; and a restorer. Of these, the order selector and change distributer have relation only to the use of my invention in connection with a number of salesmen to each change maker; this being my preferred construction, and that hereinafter fully described by me. The fact that I describe and show this fuller development of my invention herein is not to be understood however, as in any sense dedicating to the public that form of my invention wherein only one station is served by one change maker, whether near to or far from said station, and whether served in connection with a mechanical cash carrier or not. In other words it is to be understood that my claims cover among other things, a change maker at the salesman's station, operated by hand directly, and serving merely to count out and deliver at the machine, the change called for.

Since my device may be actuated by hand or by any prime mover in any well known manner, I have omitted in my drawings, any actual representation of a prime mover, leaving it to be understood that the power may be applied to my device through the pulley 2, and showing only in Fig. 1 an electric motor, at 110, in its proper connection with my electrical system; as an illustrative case of a prime mover.

Taking first the change selector, it must be stated that it is that portion of my device which connects the appropriate parts of the change deliverer with the motive mechanism of the change maker. This element of my invention may of course assume many forms, but I prefer that illustrated principally in Figs. 5, 6, 7 and 8. As shown in these figures, in connection with the change deliverer, my selecting device consists of a series of lifting bars shown at 3 in Fig. 8, which are preferably made in the form of a U shaped bail, as there shown, pivoted to a common axis 4. These lifting bars are adapted to raise or lower the slide bars 5, belonging to the change deliverer, as hereinafter described. The lifting bars are connected to drop bars, 6 by means of frictional engagement, which is secured by means of the springs 7, preferably mounted upon pins passing through slots 8, in the upper ends of the drop bars 6, said pins being supported by the lifting bars and causing the drop bars to rub against the lifting bars when moving either up or down.

Continuing description of the change selector, and referring now to Figs. 5 and 6 particularly, two means will be seen whereby the drop bars may be caused to depress the lifting bars 3, in operation of this form of change selector. The drop bars are controlled by springs 9, attached at one end to a portion of the frame 10, through which the drop bars preferably pass, and upon which the shoulder 11 of the drop bar 6 may engage for holding the drop bar up. The direction of the spring 9 is such as not only to hold the drop bar down against the frame 10, but to pull it forward, and insure engagement of the shoulder 11, with the frame 10 when the drop bar is lifted.

In Figs. 2, 5 and 6 two means are indicated for pushing the drop bar out of engagement with the frame 10. For this purpose push bars 12 are used which, in one method of engagement, transmit a pressure from the button 13, or magnet armature 13$^a$, (see Fig. 2) directly to the edge of the drop bars, and so push the shoulders 11 off of the frame 10. In the other method the proper push bar or bars act through modifying means such as are shown in Fig. 6, whereby the drop bars when withdrawn from engagement with the frame are prevented from falling the full distance allowed by the position of the restoring mechanism hereinafter described, and are caught part way. One preferred form of modifying means for this purpose, forming a part of my change selector, I have shown in Figs. 5 and 7 as consisting of a pivoted catch lever, as 14, 14$^a$, so placed underneath the frame 10 that when the drop bar is pushed off by the end 15 of the catch lever, the shoulder 11 falls into said end 15, and the downward movement of the drop bar is arrested at a point corresponding to the dimensions of the catch lever. In order that one drop bar may be controlled by any one of a number of said modifying means, as is desirable in most instances, it will be found convenient to actuate the catch levers 14, 14$^a$, by means of an axle or axles, as 16, 16$^a$, running along the instrument to a convenient point, say 17, when a trip lever, as 18, 18$^a$, 18$^b$ mounted on its axle 16 or 16$^a$, permits rotation of the latter by movement of the push bar. The automatic return of the modifying means, and of the push bar 12 is accomplished by any well known device as, for instance, the spring 19, (see Fig. 6.)

In some instances it will be found convenient to transmit power from the trip lever, as 18, 18$^a$ or 18$^b$ to the catch lever, as 14$^a$ or 14 by means of a sleeve 20 or 20$^a$, mounted upon the axle as 16, belonging to and actuating another trip lever and catch lever. This is shown in Fig. 5 in a number of instances. By use of this expedient it is clear that independent and simultaneous connections between various push buttons and bars, and their catch levers can be accomplished both through movement of the shaft itself and through movement of a number of sleeves mounted thereon.

As shown at the left hand side of Fig. 5, the drop bar 6 may, by use of one or the other of the modifying means applied to it, be made to fall into any one of three positions; and a fourth extreme position of depression may be accomplished by using the direct push bar 12, without the intervention of any modifying means whatever. By use of the frictional engagement between the drop bar and the lifting bar, as heretofore specified, the shortest of these downward movements of the drop bar 6 sufficiently depresses its appropriate lifting bar to permit the appropriate slide bar 5, (an element in the change depositor) to fall into a position of engagement with the motor frame, as hereinafter described. Any more than the smallest depression so produced, will merely occasion an inoperative rubbing between the drop bar and the lifting bar, since the stop 20$^b$, shown in end view in Fig. 2, extends under the whole row of lifting bars 3, (as shown at 20$^b$, in Fig. 8) thus preventing further downward movement than just enough to bring the shoulder 31 of the slide bar 5 into engagement with the bar 30, as hereinafter described.

The coöperating elements described with reference to the drawings in the last eight paragraphs of this specification, constitute the change selector. (Save in so far as said paragraphs contain explicit reference to certain parts of the depositor.) The term "change selector" as used in my claims, however, is not confined in its meaning to the parts above described, nor even to an assemblage of their strict individual equivalents;

but stands in its broadest aspect, for any subordinate part of a total system containing the general invention, which part does the duty of a change selector as before defined. This observation is intended now to be made once for all, as applying to the various terms to which I have given particular meanings in this specification and accompanying claims. Each of these terms will be hereinafter broadly defined, and then the specific elements collectively comprised within the meaning of each term, as these elements are found in the preferred form of my system, will be pointed out. It is the broad definition in each case which must be understood when each term occurs in any claim.

Turning now to the motor mechanism of my change maker, I preferably provide in this element of my system, three shafts driven by the pulley 2. These are the motor shaft 21, by which I mean that shaft through which is transmitted all the power used in the operation of the mechanical portions of my change maker while operating:—the restoring shaft 22, by which I mean the shaft through which is transmitted the power for restoring the machine to inoperative position after operation:—and the selecting shaft 23, by which is meant the shaft through which is transmitted the power necessary to select which of a number of stations shall be served and recorded by the machine. It will of course be understood that the omission of the recording function, where recording is not desired, will not evade the spirit of my invention, and that this function is not an essential to a selecting shaft as meant in this case. The first two of these shafts are shown in Fig. 3 in plan, also in Fig. 9; the latter two are shown in Fig. 4; the shaft 23 in Fig. 10; the shaft 22 in Fig. 35 and all three are shown in end view in Fig. 2. The most rapidly moving of these shafts is the motor shaft 21, whereby the actual movement of the coin is accomplished and the operation of printing is carried on in the recorder, when this latter is used. The restoring shaft 22 is made to take one revolution for a certain given number of revolutions of the motor shaft, and I preferably accomplish this by means of the gear shown in Fig. 7, similar in some respects to a Geneva stop. This gear comprises a disk 24, mounted upon the motor shaft, and provided with a single pin 25, adapted to enter the radial slots in the pinion 26, once for every revolution of the shaft 21. The pinion 26 is fixed upon the shaft 22, and between the radial slots which are intended for engagement with the pin 25, is provided with concave faces which fit the circular periphery of the auxiliary disk 24ª, fixed to the side of the disk 24, and shown in Fig. 7 is dotted lines. This intimate engagement between the disk 24, and the concavities between the slots of the pinion 26 makes it impossible for any back motion to occur in the shaft 22, and insures immobility of the restoring cam, 42 for the purpose hereinafter described.

I preferably provide the pinion 26 with six teeth and six slots, so that the restoring shaft 22 is given one revolution for every six turns of the motor shaft 21. This relative angular velocity is found convenient for distribution of coins made in accordance with the United States system of currency. It depends upon the maximum number of coins which under any circumstances might be necessarily distributed from a coin tube of any given denomination. The preferred ratio of the angular velocities of shafts 21 and 22 is a number equal to this maximum plus two. I do not therefore restrict myself to the employment of any given relations of angular velocity between these two shafts, so far as the essence of my invention is concerned.

As clearly shown in Fig. 4, I preferably employ the same means of transmission between shafts 22 and 23 as between 21 and 22; but the number of turns taken by the restoring shaft 22 for every complete revolution of the selecting shaft 23 depends upon the number of salesmen to be served from each central station. In the drawings to which reference is made herein the ratio of angular speed between these shafts is as one to four, since four salesmen are supplied from one change maker in the specified instrument.

The motor shaft actuates a motor bar 27 (see Figs. 3 and 35) preferably by means of a pitman 28. This motor bar preferably acts usefully by means of the motor frame comprising two side levers 27ª, attached to a shaft 27ᵇ, pivoted at 29 (see Figs. 2 and 35) and joined at the top by an expelling bar 30. (See Fig. 8.) The expelling bar is the agency whereby the change deliverer is made operative in expelling the coins. Each revolution of the motor shaft thus causes one complete back and forth movement of the expelling bar 30. When any of the slide bars 5 is lowered by the depression of its lifting bar 3 it falls in such a position as to engage the expelling bar 30 by means of the shoulder 31, on the forward movement of the motor bar and frame. (See Fig. 2.) The spring 32 or other suitable means, causes a return of the slide bar 5, when the expelling bar moves back. The various coins with which change can be counted and desired sums made up are contained within separate coin tubes 34, adapted in sizes to the various coins, into which the coins can be dropped by the slots 35 or otherwise. These coins tubes may, if desired be inclosed in a box 33, (see Fig. 8). Under these coin tubes, slides 36 are adapted to reciprocate for the purpose of pushing out the coins one by one into the chute 37, Fig. 2. The reciprocation of these slides is accomplished by means of the slide bars when moved by the action of the motor frame. The coins rest directly upon these slides, and any well known one by one deliverer may be used.

I have thus far described the change selector and change deliverer. Analysis of the above described construction will show that the "change selector" in this specific form of my invention, consists of the lifting bars 3 and drop bars 6, together with manual, electric or other preferred means for actuating the drop bars; since these are the instrumentalities whereby the particular slide bars 5 to be rendered operative in a given case are selected. These slide bars, together with appropriate slides for pushing out the coins, constitute in this specific form, the change deliverer. In my claims, the term "change deliverer" includes any device or group of devices adapted to push out the coins or other currency used in making change. In a more specific sense, including the operation of selecting the number of coins as well as the kind of coins, the "change selector" includes the "modifying means" heretofore described for determining the amount of fall to be given each drop bar. In my claims, however, I do not intend by use of the term "change selector" to necessarily limit myself to a selector combined with "modifying means" or their equivalent.

It will be convenient to next consider the restorer. Under this term is included any device or group of devices which performs the duty of restoring the change selector to such a position as permits of its being again operated for any desired order. When claimed in combination with the recorder, this "restorer" includes means for restoring the type selector as well as the change selector. In the specific construction shown, the restorer acts upon the type-selector through the change selector, but I am not limited to this arrangement.

The restorer will be fully understood in connection with the foregoing, by reference to Fig. 7. A restoring bar 38 is mounted on a swing frame 39, which is pivoted at 40, and provided with a bearing roller 41, resting upon a cam 42, rigidly mounted on the restoring shaft. As shown in Fig. 3, the swing frame 39 is preferably composed of two sides, and therefore provided with two rollers 41, on two like restoring cams 42. A revolution of the motor shaft in the direction of the upper arrow in Fig. 7 causes at the proper time, rotation of the restoring shaft in the direction of the lower arrow. The pin 25, hitherto described, is so placed with regard to the motor shaft and its connection with the motor frame, that this partial rotation of the restoring shaft and its cams takes place just as the swinging motor frame is reaching the end of a swing outward, or away from the motor shaft. It will thus be seen that, at each revolution of the shaft 21, cam 42, when once it commences to act will lift the restoring bar 38, through one quarter of its total range of upward movement. This is indicated in Fig. 7 by the five positions of the drop bar 6, shown in full and dotted lines. As will be seen from the shape of the cam 42, reckoning from the position shown in Fig. 7, there will be no movement of the swing bar caused by the first sixth of the revolution of the shaft 22. Also, the last sixth of the revolution of the shaft 22 merely serves to let the restoring frame return to its lowest point, as shown in full lines in Fig. 7. It will thus be seen that the restoring bar 38 is adapted to lift any drop bar 6 which may have been depressed, back to engagement between the shoulder 11 and the frame 10, and this by means of engagement between the bar 38 and the shoulder 43 of the drop bar or bars to be raised. If any given drop bar 6, has been depressed the full distance by the direct action of any push bar 12, or otherwise, I so relate the parts of my device that the first upward movement of the restoring bar 38, will cause it to engage with the shoulder, 43, and lift such drop bar through the first quarter of its path of return. This first movement will cause a raising of the lifting bar, 3, directly over the drop bar in question, by friction between such drop bar and lifting bar, and by thus lifting the proper slide bar out of engagement with the motor frame, prevent any more coins from being expelled by that specific slide bar until a new order has been sent in. The remaining movements of the drop bar under the influence of the restoring bar cause no further movement of the lifting bar, but simply idle friction; since both the lifting bar and its appropriate slide bar are limited in upward movement by the stop 52 (see Figs. 2, 8 and 35). Said stop extends over the whole row of lifting and sliding bars. The specific parts constituting the "restorer" in my preferred form of device just described, are the cams 42, swing frame 39 and restoring bar 38.

It is now possible to describe the operation for causing a deposit of coins in the hopper 37, without relation to any electrical means but simply with reference to manual operation through the buttons 13. It is, of course to be understood that, where the money magnets are used, their armatures act upon the push bars in the same way as would an operator's finger on the buttons 13. This is shown in Fig. 2.

In counting out any given sum in change of any denomination, it will be necessary in some cases, to employ more than one coin of certain of the denominations. For instance, now that twenty cent pieces are no longer coined, two dimes or four nickels must be supplied in order to make the sum of twenty cents. Or again, wherever more than one, or less than five cents are necessary, a plurality of cents will have to be manipulated. Consequently one or more of the drop bars must be arranged in connection with a direct acting push bar 12 and with one or more modifying means, as shown on the left hand side of Fig. 5. In United States currency, the greatest number of single coins of one kind ever absolutely necessary for making any desired change will be four, and these will be cents, and (where silver dollars are preferably used) dollars. It is for this reason that four separate movements or steps of the restoring bars are employed. Supposing for example that forty-nine cents change was to be made. This should be done by direct depression of the drop bar which liberates twenty-five cent pieces, thus causing it to fall the whole distance; indirect depression of the drop bar for dimes, causing it to drop three quarters of the full distance; and indirect depression of the drop bar for cents, whereby it causes it to fall one quarter of the full distance. In Fig. 5 I have marked the push buttons corresponding to cents with the letter "c" and those corresponding to dimes with the letter "d". This figure, together with the description already given of my preferred change selector and modifying means, will make the above description of manipulation clear. Supposing the machine now to start from the position shown in Fig. 7. As the expelling bar 30 is moved backward by the shaft 21, at the end of its first revolution, to bring it into engagement with the notch or shoulder 31 in the slidebars which have been liberated as above mentioned, (see Fig. 2) the pin and pinion 25, 26 will bring the roller 41 at such a point on the cam 42, as corresponds to the commencement of its eccentricity. This will be sixty degrees away from the position shown in Fig. 7, or the angular distance of one tooth in the pinion 26. Where my device is used for manual operation in making change, care should be taken that the expelling bar is in its forward position, and the cam 42 stands as shown in Fig. 7 when the push buttons are operated. Where electrical means are employed as I prefer to do, this order of operations is insured by means hereinafter made clear. As rotation of the shaft 21 continues, the expelling bar is drawn forward, and with it the three depressed slide bars. This of course, pushes out a quarter, a dime and a cent into the hopper. As the expelling bar returns backward, the cam, by rotation under the roller 41, will raise the restoring bar 38, through one quarter of its upward path. This occurs just as the expelling bar is on the point of beginning to move forward again. Inasmuch as the drop bar for twenty-five cents has fallen all the way down, it will be pushed upward by the restoring bar through the first quarter of its path of return. As before described, this small movement is sufficient to raise the lifting bar enough so as to take the twenty-five cent slide bar out of the path of the motor frame in its next swing, and prevent any more twenty-five cent pieces from being expelled during that order, by the coin or change depositor. The drop bar for dimes, having fallen only three quarters of the total distance, will only be just reached, but not lifted, by the bar 38; and the drop bar for cents will, of course, not yet be touched by the bar 38. The next revolution of the motor shaft 21 will cause the deposit of one dime and one cent, since neither the slide bar for dime nor for cents has yet been raised out of operative engagement with the expelling bar. With the return of the expelling bar to its backward position, the cam will raise the bar 38 through the second quarter of its path, and this time will raise the drop bar for dimes through a corresponding quarter of its path, and thus liberate the slide bar for dimes from the next action of the motor frame. In the same manner, the next two revolutions of the shaft 21, will liberate two cents, and the next two actions of the restoring bar 38 will complete the lifting of all the drop bars to their positions of rest on the frame 10. Consequently the next movement of the expelling bar will distribute no more change, and, on its return, the cam will be restored to the position in Fig. 7, and the machine be ready for another order.

Although as prefaced, the above description of operation has been given with relation to use of the machine in the presence of the operator, and by his hand; certain features of the specific devices as shown are rendered necessary for use at a distance by a number of operators in turn, and by electricity. Among other of such features may be mentioned the use of six teeth instead of only five (or even at a pinch four) in the pinion 26, with the consequent idle movement of the cam 42. These extra movements are rendered necessary as will be later seen, by the exigencies of use of one central machine by a number of salesmen. Where the change maker is only used by one salesman at a time fewer movements are required.

Having thus described one of the main divisions of invention: the change maker proper:—it will next be well to describe the recorder, which is another of the four main divisions of my total invention and is herein claimed. I use the term recorder in my claims to mean that portion of the whole invention which makes a more or less complete record of what transpires in connection with the use thereof. As specifically shown, the fullest use made of my device includes recording the amount of change taken out at any salesman's station from which such order has been sent. Of course, where the machine is used directly, and at only a single station, or from a single station at a distance, this latter record will be unnecessary. Other details may be recorded by a proper instrument in connection with my change maker, without departing from the broad spirit of my invention.

The general outline of the recorder preferably used by me is made clear from Figs. 2 and 3, aided in details by Figs. 4 and 35, wherein the type levers are shown at 43 and their operating pins at 44.

From what has already been said regarding the relation of the number of coins to be dropped to the position of the various drop bars, it will be understood that the pins 44 on the drop bars, by pushing the levers 43 up or down, produce various positions of the type levers corresponding to various positions of the drop bars. By this means different types 45 (see Fig. 4) of the type sector 46 may be brought opposite the printing platen 47. Fig. 4 shows the coöperation of type bar and pin, and Fig. 3 makes this clear by a plan view.

It is evident from Fig. 3, that where the type bars 43 are grouped closely together, as is desirable, only a few of them can directly engage with the pins on the drop bars. In order to allow of this close arrangement I have devised certain constructions somewhat analogous to the "modifying means" already herein described for another purpose, and which I will now make clear.

As most clearly shown in Fig. 3, the type levers are all pivoted loosely upon a common shaft 48 except the outside levers. This shaft 48 is preferably in two independently rotatable parts of equal length, meeting in the middle. The type levers on the extreme right and left of the group shown in Fig. 3 are attached directly to the respective halves of the shaft 48 upon which they are mounted. The right half of the shaft 48 is made to rotate by actuation of the arm 51, at the extreme right of the figure, which is shown attached directly to said shaft by a screw. The arm at the extreme left of the figure rotates the left half of the shaft. Thus these two arms respectively actuate the type bars at the extreme right and left of the group of bars shown in Fig. 3.

In order to transmit the proper change of position to such type levers as cannot make direct engagement with their corresponding drop bars, the rear extensions of such type levers engage with appropriate pins 49, mounted on concentric sleeves 50, adapted to turn about the shaft 48, and these sleeves are moved by the appropriate drop bars through the rigid arms 51, making engagement with the pins 44 of the drop bars as before described with regard to the directly connected type levers.

The money type selector, as above described, and as specifically used in my preferred form of apparatus, comprises the drop bars, means for causing more or less fall thereof, the type bars, and the means for engagement between such drop bars and type bars. It will thus be seen that, in this preferred form of apparatus, the money type selector and the change selector have certain elements in common. But it is not to be understood that when the terms "money type selector" and "change selector" are used in my claims, they are intended to be limited in their meaning to the parts composing them as above described, or to be limited to the inter-relation of parts specifically herein set forth. As understood in my claims, the money type selector is any mechanism whereby the types which print an indication of the pieces of change withdrawn are so selected as to correctly indicate the total amount of change withdrawn.

The printing mechanism is actuated by means of a record bar, 52, shown in two positions in Fig. 4, and normally supported by the armature 53 of the magnet 54. This will be understood by reference to Figs. 3 and 35; the armature being shown withdrawn in the former, and in its supporting position in the latter. This record bar is pivotally attached at one end to a swinging lever 55 (see Fig. 4) which supports the platen 47, and to which is fixed the pawl 56 whereby the train of gears 57 is driven. (See Fig. 35.) A printing ribbon 58 carrying the ink for the record, is fed from the roller 59, over proper supports 60, onto the roller 61, by means of the gear 57. The strip of paper upon which the record is kept and which should be rather broader than the combined width of the types, is fed from the roller 62, over a proper support 63, and the platen 47, onto the record roller 64, against which it is preferably held tightly by the roller 65. The roller 64 is directly driven by the pawl 56 and the train of gears 57 causes revolution of the roller 61 in a direction the same as roller 64.

Referring to Figs. 2 and 3, it will be seen that the record bar 52 of the recorder, is actuated by means of a record hook 66, mounted on the motor bar 27, which hook coöperates with a notch or shoulder 67 in the record bar 52 for the purpose of pressing the platen 47 against one of the types 45. This operation of the printing mechanism of the recorder takes place when the armature 53 which normally supports the bar 52 is withdrawn by the magent 54, permitting the bar 52 to drop. As hereinafter described, the action of the magnet 54 is only momentary and, after the record hook 66 has operated the recorder, by means of the notch or shoulder 67, its return movement replaces the recorder in the position shown in Fig. 4, by impinging on the shoulder 67ª (see Fig. 35).

The raising of the record bar is accomplished by the two opposite movements of the record hook 66. The forward movement for printing causes the forward end of the bar 52 to ride up on the armature 53, and, on the return or backward movement of the hook 66, the bar 52, being pushed backward as stated above, its opposite or outer end is raised in its turn, since the upper end of the lever 55 is higher when in the position shown in full lines in Fig. 4 than when in the forward or dotted line position. By this successive raising of the two ends of the record bar 52, the notch 67 is thus removed from engagement with the record hook 66, until the magnet 54 is again operated. Thus the recorder only prints a record once for each liberation of the record bar by energizing of the magnet 54.

It will be obvious to those skilled in the art that the supporting hook 53 may be operated in many ways other than by magnetism. I have only shown the preferred means as employed by me when my devices are to be operated by electricity.

In the operation of my change maker by electrical means from a distance, the operation of the push bars for liberating the drop bars is accomplished by means of the money magnets 68, as shown in Fig. 9. One terminal of each magnet is preferably connected to the frame of the machine, the other terminal of each magnet being carried off to its appropriate insulated wire in a cable 69. This cable may be connected with circuit controlling devices under the control of any number of salesmen. (See Fig. 36.) It is to be understood that I am not limited to a change maker or recorder operated from a distance.

Where it is desired to make a central change maker useful for a number of salesmen, it is of course necessary to provide means whereby the regular systematic operation of the central change maker or recorder or both shall not be disturbed by the sending in of simultaneous orders from two or more salesmen. For this purpose I provide a selecting operator and order setting device at the post of each salesman, or group of salesmen, and also provide an order selector at the central change maker for the purpose of bringing the change maker within the influence of one selecting operator and order setting device after the other, each in turn and without confusion.

The term "order selector" as used in my claims includes any device whereby the central machine is brought into potentially operative relation with each of the salesmen's stations served thereby successively; whether these operative relations depend upon electricity or upon any other force or mode of action. In my preferred form, this order selector is dependent upon electrical principles for operation, and is controlled by the selecting shaft 23, see Fig. 10.

Having thus defined the meaning to be attached to the term "order selector" in my claims, I shall proceed to point out the construction of this element of my invention in its preferred form.

In the form illustrated, my order selector comprises a system of rotary switches 70, (see Figs. 10 and 11) which switches may be divided into four groups as follows: reference being had to the diagrammatic illustration thereof in Fig. 1.

First: Key selecting switches 72, which connect one terminal of each money magnet to a corresponding contact piece (see Fig. 28) in the money keys at one salesman's station after another. For clearness only one of these terminals is shown in Fig. 1, at each station.

Second: A station selecting switch 77, connecting one end of the battery or generator 71, see Fig. 1, to one side of each of the setting switches 149, 150 in each salesmen's station successively. (See Fig. 28.)

Third: A switch 78, connecting one end of the generator to the car starting magnet of one track after the other.

Fourth: A switch 70, connecting one maintaining magnet after the other in the primary setting circuit of the salesmen's stations.

The first class above described is composed of as many switches like that shown in Fig. 11, as there are money magnets, 68. The word "switch" in this connection includes a group of circuit closers, such as 72, in Fig. 11. There will be as many such circuit closers 72 in each "switch" as there are stations to be served from one central machine.

As shown in Fig. 11, my preferred form of circuit closer used for the purpose of an order selector, comprises an insulating base 73, carrying two spring terminals 74 and 75, adapted to be brought together by means of a cam 76, on the shaft 23. A separate longitudinal row or series of these spring circuit closers 72 is provided for each station.

The station selecting switch, or second class above described, is preferably composed in the same way of a single spring circuit closer for each salesmen's station; one terminal of which, as for instance 74, is connected with the battery or generator 71, and the other terminal to the setting switches in the appropriate salesman's station instrument. In the same way, switches of this kind are used in the third and fourth class of switches above described.

The various switches in the order selector preferably used by me are diagrammatically shown in Fig. 1. The key selecting switch at 72, the station selecting switch at 77; the switch of the third selecting class above named at 78; and the fourth class of switches at 79.

In order that the change distributed by the operation of each order may be carried to the car which runs to the proper salesman's station, I provide a change distributer preferably operated by the same mechanism which moves the order selector, as shown in Figs. 10 and 12. Any device having the above duty in connection with my system will answer to the term "change distributer" as used in my claims.

In Fig. 10 are shown four car chutes, 80, adapted to be put into communication one at a time, with the main chute, 37, by means of an inclined distributing chute 81, adapted to be revolved through a quarter of a revolution at a time by the distributing shaft 82. These chutes are placed over the incoming terminal of each of four cash carrying tracks, or, as shown in Fig. 36, one or more such chutes may be directly used, when the station served is near the central machine. A chain 83 driven by a sprocket 84 mounted on the shaft 23, drives a sprocket 85, which transmits power by means of a spring gear or connector shown at 86 Fig. 14, and thus actuates the shaft 87 which drives the distributing chute 81 through the shaft 82.

As shown in Fig. 4, shaft 23 is made to turn once through ninety degrees for every complete revolution of the shaft 22; and thus it will be seen by what has been previously set forth, that, after the restoring of all the change selecting drop bars and type selectors by means of one revolution of the shaft 22, the shaft 23 is given a quarter of a turn, and the cam 76, Fig. 11, is thus made to close the next succeeding set of order selecting switches. At the same time a quarter revolution is imparted to the shaft 87 and consequently to the distributing chute 81. Thus, after the completion of one change delivery, in compliance with an order, a new station and track are put in communication with the change maker by the order selector, and the common chute 37 is made to communicate with a new car chute 80, corresponding to said track. In this specific construction, the revolving chute 81 (see Fig. 12) constitutes the change distributer. At the same time, in order that each amount of change set down by the recorder may be associated with some letter or sign indicating the station through which the order for that amount of change has come in, I provide a station type selector (see Fig. 4) preferably comprising a station type bar or lever 88, carrying the usual type sector 46, bearing appropriate types, the position of which types is governed by a cam 89, on the shaft 23, which, as each series of switches in the group 70, is successively closed, imparts a new position to a type selecting lever 90, preferably pivoted at 91, and pressed by a spring 92, upon the cam 89.

This lever 90 imparts the appropriate position to the lever 88, preferably by the action of a pin 44, on a slide bar 93, which may be guided as at 94 (see Fig. 4) said pin 94 being embraced by the forked end of the lever 88. The portion of the recorder just described may be used alone, and will be so used, wherever the car is merely used to deposit the cash received, without withdrawal of change.

Coming now to the car starter, it must first be stated that the cash carrier may be composed of many forms of electrically propelled cars, for instance such as shown in Fig. 21, running on wires 95, 96. References will be had in this portion of my description to Figs. 18, 19, 16, 17 and to Fig. 1. As shown in Figs. 18 and 20 the track terminal is preferably provided with a dash-pot buffer, 97, comprising a piston 98, moving within the cylinder 97 by impact of the car against the outer end of the piston rod 99, whereby the air cushion is formed behind the piston, which gradually arrests the car. In order that when the car reaches the end of the track, its motor may come to rest, one of the track wires as 95, (see Fig. 19) is provided with insulation 100, whereby the current supplied to the motor over the track wires, as is preferably done, and as shown in Fig. 1; is interrupted. For purposes of starting the car, the insulation 100 is covered by a metal sleeve 101, which as diagrammatically indicated in Fig. 1, is directly connected to one terminal of its appropriate circuit closer in the track selecting switch 78, which switch, as heretofore described is preferably composed of a number of such circuit closers in circular series, as shown in Fig. 11. In order to avoid a sudden jump and spark at the car wheels before they run onto sleeve 101, the supplemental metallic sleeve 102 is preferably provided.

In Fig. 17 is shown a group of four maintaining switch controllers 103, whose controlling circuit is shown in Fig. 1; comprising one magnet 103 for each salesmen's station, each magnet controlling an armature, 104 (see Fig. 16) which normally holds down the maintaining switch lever 105, which, when released is brought to the dotted line position as shown in Fig. 16, by means of the balancing weight 106. The balancing weight 106 is preferably supplied with an extension 107, for the purpose of giving it a greater rotative inertia. When a magnet 103 (see Fig. 1 in two places) is actuated by closure of circuit through the same, the lever 105 provides connection between standards 108 and 109, and thus closes the circuit through the motor mechanism 110, and its generator of any desired type, 169, which run the change maker, and keeps the circuit closed until the order is completed.

As seen in Figs. 1, 16 and 17, the spring switch 111 is supplied, under the rear end of each lever 105, and the other end of the lever 105 stands in the path of a screw 112, or other projection, appropriately fastened to the shaft 87, (see Figs. 10, 16 and 17) there being a separate screw opposite each maintaining switch, said screws or projections being set at ninety degrees to each other around the shaft, where four stations are supplied. The arrangement of these projections or screws with relation to the various maintaining switch levers is such that just as the shaft 87 is made to turn for the bringing into operation of a new car chute, the maintaining switch lever, corresponding with the order just filled, is struck by its appropriate projection 112, and by the inertia of the weight 106, 107, the rear end of the lever 106 strikes the switch 111, momentarily closes the same, and then falls back against the retaining armature 104.

The effect of the momentary closure of the switch 111 will be seen from the inspection of Fig. 1. The circuit closed by 111, brings the car starting magnet 113 into the circuit of the generator 71, together with the appropriate circuit closer in the track selecting switch 78, the insulated sleeve 101, the car motor 114, and so back to the generator. It will be understood that the track switch 78, being included among the group of switches 70, has been brought into the actual position diagrammatically indicated in Fig. 1, just before the reaction of the weighted lever 105 has closed the car starting magnet circuit, at 111.

As seen by inspection of Figs. 1, 13 and 13$^a$, the magnet 113 when energized, immediately acts to preserve its own circuit, by means of the circuit closer 115, inasmuch as the metal frame and armature of magnet 113 are in electrical connection with one side of the magnet wire, as shown. It will thus be seen that a circuit is established through the magnet 113, the switch 78, sleeve 101, and the cash-carrying car motor 114. This starts the car on its way to the salesman's station, and, as the wheels run off of the sleeve 101, a new circuit established directly by means of the wire 95, continues the operation of the car motor and at the same time, the starting circuit being broken, at sleeve 101, the armature of the car starting magnet 113 is released and the starting circuit finally broken.

The car starting magnet is shown in detail in Figs. 13 and 13$^a$. It will be understood that this magnet will accomplish all its proper functions irrespective of its mechanical or special relation to the rest of the machine. It may be attached to any part of the frame, or placed at any reasonable distance from it, without any modification of its action. In Fig. 13$^a$, however, taken in connection with Fig. 10, I have shown, in plan, the preferred location of my magnet 113, with relation to the other parts.

In Figs. 21, 22 and 23 are shown the cash carrying car and in Figs. 24, 26 and 27 are shown details of the automatic reversing device. The car is preferably propelled by means of an electric motor of any desired construction, whose armature and field magnet are shown at 115$^a$ and 116 in Fig. 21. It is desirable that whenever the car reaches one or the other end of its track it shall be automatically put in condition for running in the opposite direction when next set in motion. This may be accomplished by many well known devices, but I prefer to employ the automatic reversing device illustrated in Figs. 21, 24 25, 26 and 27. For this purpose I employ a two-part rotary switch, shown in Fig. 27, composed of two metallic segments 117 and 118, insulated from each other, and adapted to bear upon the commutator brushes 119, 120. The segment 117 is prolonged in the form of a shaft 121 controlled by a crank pin 122, and kept in constant electrical connection with the frame of the motor by means of a spring contact 123, or otherwise. The segment 118 bears constantly upon the terminal 124 which, as shown in Fig. 21, connects with one of the field magnets, as at 125.

It will be seen from Figs. 21, 25 and 27 that, by rotating the rotary switch on the axle 121 through ninety degrees one way or another; either the brush 119 may be connected by segment 118 to the field magnet through the terminal 124, while the brush 120 connects with the frame of the machine by segment 117, shaft 121 and spring 123; or, in the other position of the switch, brush 119 may be connected with the frame of the machine, while brush 120 is connected with the field magnet coil. Since the current always flows through the field magnet coil in the same direction, the reversal of connections above pointed out will accomplish the reversal of direction of rotation of the motor armature. The current will thus enter, say by wire 96 (see Fig. 21) thence by driving wheels 128 to the frame of the machine, to spring 123, axle 121, segment 117, through armature by either brush 119 or 120, according to the position of the pitman 129 and attached switch, and out of the armature to the spring contact 124, (shown in Fig. 21 insulated from the frame) which touches field magnet terminal 125. Here the armature current is joined by the field magnet of current, which left the frame of the machine to enter the field magnet at 127. From 125, the total current proceeds by wire shown in Fig. 21, to magnet 132 and thence to that part of the frame which supports the wheels 126, and which is insulated from the main frame of the car as indicated by parts shown in solid black.

In order to accomplish the rotation of the switch, I provide a pitman 129, (see Figs. 21, 24 and 26) connecting the crank pin with the disk of magnetic material 130, against which bears a spring 131, tending to produce friction between the disk 130 and the driving wheel 128. As soon as current flows through the motor on the cars it passes through the coils of the magnet 132, and, by this means, the disk 130 is withdrawn from contact with the wheel 128 during the running of the motor as shown in dotted lines in Fig. 24. No sooner does the car run up onto the insulated end of the track shown at 101, than, current being cut off, the disk 130 is pressed against the wheel 128, by the spring 131. Since the momentum of the car causes continued rotation of the wheel 128, after current is cut off, this rotation will be transmitted through the disk 130 to the pitman 129, and the shaft 121, to the rotary switch. By this means the connections are reversed within the motor every time it is stopped at either end of the track, and consequently, when the motor is again started as heretofore described, it will run in the opposite direction.

The change receptacle on the car is shown in Figs. 23 and 24, at 133, and is preferably provided with a removable bottom 134, which may be held in place in any well known way as conveniently by the compressible springs 135. The money receptacle into which the original payment of the purchaser is placed, is shown at 136 and is provided with a bottom 137, hinged at 138, and held in its place by means of a pivoted catch 139, which holds down a bent rod or bar 140, and thereby retains the bottom 137, in proper position for holding the payment.

The positions of the money receptacle and change receptacle on one side or the other of the motor mechanism of the car are immaterial, and in Figs. 22 and 24, which show opposite end views of the motor mechanism, the reversal of the positions of these two receptacles is shown. The payment is finally delivered at a point near the change maker, when the upper flap of the catch 139 comes in contact with the arresting buffer, at the change maker end of the track. This throws the catch into the dotted line position of Fig. 21, when, the rod or wire 140 being released, the bottom of the box 136 falls, and the money is discharged. The bottom will remain in this condition until replaced by the salesman when the next payment is made.

It is of course necessary to the proper action of the dash-pot buffers at each end of the line, that, when the car is away, the pistons should be extended. In order to insure this action, spring catches 140ª are provided at each end of the car (see Figs. 21 and 22) which on arrival of the car at either end of its travel, embraces the knob 141ª at the end of the proper piston rod 99. (See Figs. 18 and 20). These springs are omitted for clearness, in Fig. 24.

Having now described and defined three of the four main divisions of my invention, the last, namely the preparing device, remains to be described. For this purpose reference will be had to Figs. 28, 29, 30, 31, 32, 33, and 34. This preparing instrument may be divided into four instrumentalities, which I term:—"The selecting operator"— the "order setting device"—the "motor starter" and the operator returning mechanism." In the broadest aspect of my invention this group of devices may be of any nature, and each of the elements thereof may be constructed in many ways at the option of the manufacturer, it being under some circumstances possible to do without one or more members of the group; but as long as the organizations hereafter called for by my claims are present, such various constructions will all be within the spirit of my invention. It should be clearly understood that I look upon the novelty of my invention as extending to the organization in one device of separate groups, each having a definite duty to perform (such for instance, as selecting, operating the selector or starting the motor) the mechanical or electrical composition of such groups being immaterial, as long as the combination of duties thereby performed is that called for by my claims respectively. I have sought to make this clear heretofore, but it is particularly true of some aspects of my preparing instrument.

The "selecting operator" as understood in my claims, is any mechanism which is adapted to prepare the change selector or type selector or both for operation when the proper position of the change maker motor mechanism is reached. The word "order setting device" as related to the change maker and car, is any instrumentality which prepares the car starter for action at the proper time with relation to the change maker also successively connects and disconnects the motor starter at the salesmen's station and, where the "selecting operator" is used, it brings said selecting operator into operative relation to the change maker, through the order selector.

As related to the recorder, the order setting device is any mechanism that prepares the printing mechanism releaser for action at the proper position of the change maker motor mechanism. The motor starter is any device for liberating or starting the motor which actuates the change maker. The "operator returning mechanism" comprises any means for replacing the selecting operator into inoperative position, after each order.

In the electrical form of device, which I prefer, and the best embodiment of which now known to me I have heretofore described, the selecting operator consists of a series of contact terminals 141, and coöperating contact levers 142 controlled by any means, but preferably by plungers 143 having buttons, 144, upon which the denomination of change to be controlled by the respective plungers may be written or printed.

I prefer to attach to each contact lever a spring 145 mounted as shown (see Fig. 33) so as to cause an upward or downward tendency in the contact levers according as any such lever is in its upper or its lower position respectively.

It will be seen that, by depressing a plunger 143, the contact lever 142 under such plunger may be thrown into its depressed position, and caused to make electrical connection with its appropriate contact terminal 141. In the specific form shown, the movable levers on one side of the machine are adapted to make contact with the terminals 141 on the opposite side thereof. The circuit break thus controlled is indicated in Fig. 1 at 146; and as this figure is a mere diagram, only one representative break is shown at each station, A, B, C, D. As seen in Fig. 1, each break 146 is in circuit with a single member of the spring circuit closer appropriate to its own salesmen's station at the rotating key selecting switch, indicated at 72 in Fig. 1, the preferred construction of which is shown in Fig. 11. In Fig. 1 the key selecting switch is shown in diagram as comprising one switch in each salesmen's circuit, and only one money magnet 68, is there indicated.

It will of course be understood that there is a separate money magnet and rotating switch for each lever 142, at one station, and as many circuit closers in each rotating switch 72, as there are salesmen's stations served by one central machine.

The "selecting operator" in the specific device by me shown consists of the parts described in the five preceding paragraphs excluding the last.

Coming now to the "order setting device". In my preferred form I employ two magnets which may be placed near the selecting operator and are indicated in the drawings by the numerals 147, 148. Magnet 147 I term the primary order setting magnet, and magnet 148 is the secondary order setting magnet. As shown in Fig. 1, this pair of magnets is used at each salesmen's station. A switch or circuit breaker is shown at 149, and is termed by me the primary setting switch, because it sets or prepares, at the keyboard, the primary order setting magnet circuit, which is finally closed at the central machine. The circuit break shown at 150 (see Figs. 1 and 28) I call the secondary setting switch. This circuit break is made between 161 and 162 (see Figs. 31 and 32). It is called the secondary setting switch because it prepares or sets the circuit through the secondary order setting magnet 148. The circuits commanded by these two switches are called respectively the primary and secondary setting circuits. They are useful in insuring the necessary time and sequence of operating circuits in the machine, as will be seen hereinafter. Of course these last named switches may be operated by any desired means, but I prefer to employ the device shown in Figs. 30 to 34 inclusive, for this purpose. In these figures the order setting plunger 151, depresses a lever 152, which I call the motor starting lever. The movable side of the switch 149 is normally brought to the switch closing position by means of the spring 153; which, as shown in Fig. 32, is fixed in position at its lower end, and is fastened at its upper end to the locking piece 154$^a$, which it revolves around its pivot 154. The depression of the lever 152, by bringing the bent end of said lever into the square space 155, as shown in Fig. 30, removes the restraint otherwise afforded against the action of the spring 153, and permits this spring to close the break 149. As shown in Figs. 1 and 28, the closure of this break prepares the primary setting circuit, through the generator 71, so that when afterwards closed at 156, as hereafter described, the primary setting magnet will be energized. When this occurs the armature 157, which is pivoted at 158 (see Figs. 31 and 34) and is fixed to a catch 159, releases the bent lever 160 by touching the terminal 162, as shown in Figs. 31 and 32. The bent lever 160 is rigidly fixed to a shaft 163, the other end of which is also fixed to the lever 164, which, as shown in Fig. 31, projects over the lever 152. As shown in Fig. 1, this closure of the break 150 prepares a circuit through the secondary setting magnet 148, and also through the record magnet 54 which releases the record printing mechanism, which circuit is finally closed, as hereafter described, at 165. When this closure of circuit occurs, secondary setting magnet 148 acts upon its armature 166, which is rigid upon the pivot shaft 154 (see Figs. 32 and 33). This opens the break 149 but does not allow the return of the lever 152 by means of the spring 167, as the locking piece 154$^a$ immediately catches the lever 152 under the opposite shoulder of the square hole 155; said shoulder being a little higher, as shown than the shoulder first brought into action. As soon, however, as the secondary setting magnet circuit is broken as hereafter described, at 165, the armature 166 is released, and the lever 152 is permitted to return to position shown in Fig. 33, under the influence of the spring 153. When this occurs, the break 150 is reëstablished by separation of 161 and 162, since the bent lever 164 is pushed up by the return of 152, and thus rotation of the shaft 163 restores the bent lever 160 to the position shown in Fig. 34. It will be understood that the locking piece 154ᵃ, carrying the movable member of switch 149, is rigidly attached to the end of the shaft 154, carrying armature 166.

The motor starter in my preferred device consists of a switch 168 (normally kept open by the lever 152, when in the position shown in Fig. 34) and an electric circuit governed by said switch. As indicated in Fig. 1, a motor starting switch 168 is provided at each salesmen's station. It is obvious that when the lever 152 is depressed by the plunger 151, the spring switch 168 will close, (see Figs. 30 and 34) and, as indicated in Fig. 1, the generator which starts the change maker motor is brought in circuit with said motor as shown at 169 and 110 in said figure. As also shown in Fig. 1, the maintaining lever 105, heretofore described, is prepared to come into action for maintaining this circuit through the motor, inasmuch as the maintaining switch magnet 103 is always in the primary setting circuit, and is actuated when the break at 156 is closed. For greater clearness in exposition of the electrical operation of my device, I have indicated the maintaining magnets 103 in two places in Fig. 1. They are shown as simple circles in connection with switch 79, to exhibit the preferred means for energizing or operating them when break 156 is closed. They are also shown lower down in the figure in a form to exhibit their mechanical action in setting up the circuit through motor 110, which maintains action of said motor after the original circuit is opened at 168, by return of the lever 152.

In the described form of my invention, the order setting device as related to the change maker consists of the following parts. The order setting magnets 147, 148 and their armatures and necessary circuits; the lever 152; the locking piece 154ᵃ and switch 149; and the lever 164 and switch 150, with the shaft connecting them. As related to the car, this device further includes the magnet 103, its armature and the lever 105 adapted to be prepared to react upon the switch 111.

The specific form of the motor starting switch is of course not essential to the operation of my device, and it will be understood that, as long as the motor starting switch or other motor starter is actuated in the described relation to the order setting device, such arrangement will be within the spirit of my invention. It is also obvious that liberation of a motor having normally a tendency to move is the equivalent in my invention of the setting up of motor conditions in a machine normally quiescent.

It remains to explain the operation of the switches 156 and 165 by the change maker. As seen in Figs. 9 and 35 the side pieces 27ᵃ of the motor frame are each provided with an insulated spring switch shown at 156 and 165 in Figs. 1, 9 and 35. Fixed to the restoring shaft 22, as shown in Fig. 9, are two projections, 170 and 171. These are preferably radial with regard to the shaft, and they have such a relation to the direction of rotation of the shaft that projection 170 is always in advance of 171 to the amount of an angle equal to the angle between two successive teeth in the gear 26, whereby the shaft 22 is driven.

As shown in Fig. 9, projection 170 is in such a position that as the motor bar 27 swings forward, the switch 156 will be closed by impinging against the end of 170. In the same way, the next time that the motor frame swings forward, the axle 22 will have revolved through the angle represented by one tooth of its gear 26, and the switch 165 will be closed by impinging against the projection 171. Of course, by this time, projection 170 has moved out of the path of switch 156.

It will now be possible to describe the specific operation of the various parts of my device, as preferably constructed and heretofore described. And it is to be remembered that these operations may be greatly varied in detail without departing from my invention as called for in my claims, particularly where the change maker is directly and immediately operated, instead of from a distance. The purchaser having delivered the payment to the salesman, and the cash carrying car being in the position indicated in Fig. 1, that is to say, standing on the insulated sleeve 101 at the change maker end of the track; the salesman proceeds to the operation of selecting the change necessary by manipulating the proper plungers 143. As shown in Figs. 31, this will throw certain levers 142 into contact with the terminals 141 under them, and, by closing the breaks 146, (see Fig. 1) prepare the money magnet circuits for closure at the proper time at switch 165. The following operations will be best followed in general outline by reference to Fig. 1. The salesman will next depress the order button 151, and, as before described, will thus close the breaks at 149 and 168. The closure of this latter break will start the motor 110, and the change maker will begin to move under the influence of the motor shaft 21. At this point in the operation the motor frame and the restoring bar will move idly, and this movement will continue until the selecting shaft 22, has brought the order selecting device or rotary switches 70, into the position corresponding to the station in which the order button has been depressed. As soon as this point is reached, the projection 170 will be brought opposite the switch 156 (see Figs. 9 and 35) in the course of further movement of the machine; and, as the motor frame completes a swing forward, circuit will be established as follows:—From one end of the generator 71, through a switch 156, through the proper circuit closer 74, 75 in the switch 79 of the order selecting series of rotary switches, through the proper maintaining switch, thence through primary setting magnet 147, switch 149, station selecting switch 77, in the order selecting device, and thus back to the generator. The consequent attraction of armature 157 by magnet 147 (see Figs. 31 and 34) will, as before stated, close the switch 150 say at C in Fig. 1; and the maintaining magnet 103, by releasing the maintaining lever 105, will insure maintenance of circuit through the motor 110. At the next swing of the motor frame toward the shaft 22, (see Figs. 9 and 35) the switch 165 is closed, as before described, the shaft 22 having revolved so as to bring the projection 171 in the path of movement of said switch 165. Two circuits in multiple arc are thus established. The first circuit passes from one end of the generator, through station selecting switch 77, to salesmen's station C, across break 150, previously closed, through secondary setting magnet 148, record magnet 54, switch 165, and thus back to the generator. This circuit opens the switch 149 (see Fig. 33), by means of magnet 148, and releases the record bar 52, by means of the record magnet 54, so that it drops onto the record hook 66 (see Figs. 2 and 35). This last operation prepares the recorder for action.

The second circuit closed by 165, is through the various switches 146 which have been closed by the levers 142, thence through the money magnet selecting switch 72, and through the proper money magnets corresponding to the plungers 142 which have been depressed by the salesman. As plainly shown in Fig. 2, these money magnets 68 act upon their armatures shown in dotted lines to actuate the push bars 12. This, of course, depresses the proper drop bars, and by this means selects, not only the proper coin-manipulating slide bars 5, but also as before described, the proper types in the recorder which should be brought opposite the platen. The next swing of the motor frame breaks the circuit of the secondary setting magnet 148, and the order setting devices is returned to its normal position, by its spring 37, shown in Figs. 33 and 34. This same swing of the motor frame, acting as before described, through the record hook 66, and the record bar 52, pulls the platen 47, against the types, and insures the printing of the proper figures on the strip of paper for indicating the station which has taken that amount of change will be also printed, since, as before explained, the position of the shaft 23, carrying the switches 70, governs the selection of station printing type, as seen in Fig. 15. When the motor frame thus pulls on the record bar, it returns it to the support of the armature 53 (see Figs. 9 and 35) and during the rest of the operation of the change maker no further record is made, but as the motor frame rocks back toward the record mechanism, it catches the shoulder 67ª (see Figs. 2 and 35) and operates through the pawl and gear train to feed the strip and the ink ribbon into a new position. The remainder of the change is discharged into the proper car through the appropriate distributing hopper, and after the order is completed, the order selecting device and distributing chute make a quick turn by means of the gear shown on shaft 23 in Fig. 4. This, as before explained, starts the car by throwing the lever 105, and closing circuit at 111, and places the machine in position for the next order, so that if, during the process above described, another salesman has operated another preparing instrument to prepare his order, the machine will continue working until it has filled said order.

Inasmuch as the throwing back of the lever 105 into the position shown in Fig. 1 is accomplished by the turning of the whole order selector; and consequently of the switch 78; it will be evident that said switch 78, in so turning, must operate to select, in its new position, the car track appropriate to the order just filled.

The car having started, will proceed along the wires 95, 96, to the station C, in a way well understood, and when the car reaches the salesman, he opens the change box 133, gives the change to the customer, and puts the payment into box 136, and, replacing the car in operative position off of the insulation 101, returns the same to the change making station. Here the money is deposited in the way already described, and the operation is completed. It will of course be seen that, if the exact payment is made to the salesman, he merely sets his order button, the machine goes through part of the motions, without actually delivering change, and the proper car is started and is used on its return trip, and in delivering payment. The returning mechanism for the key levers 142, is shown in Fig. 31, and consists of a bail 172, passing under the ends of said levers, and controlled by a plunger 173, said bail being pivoted at 174. It will thus be seen that any number of preparing instruments connected with one change maker may be simultaneously set without confusion, the change maker simply proceeding to fill out and deliver one order after the other in its turn, as the order selector 70 brings one station instrument after another into relation with the change maker.

The general relation of parts involved in the use of the whole of my invention is shown in Fig. 36, wherein the general change maker is shown at 175, with the coin tubes 130

34. The recorder is preferably incased as shown at 176, and the change chutes at 177 carry the change into the cars when in position, as shown with one car at 178. In this figure, three tracks, 95, 96 are shown for serving distant stations, A, B and C; and a special chute is shown serving station D directly, said station being supposed to be near the central machine. At each station is shown the necessary preparing instrument 178 connected with the central machine by cables 179 wherein the wires are carried, for making the necessary electrical connections indicated above. At each distant station, the wires 95, 96 abut upon a buffer 97, heretofore described. At 180 is shown one form of box for general receipt of payments sent in.

It will be instructive to consider the time relation of the movements of the three shafts to the occurrence of certain positions of the driven mechanism, and to the position of the cams 42. This may be done by reference to Figs. 2, 3, 4, 7, 10 and 17. Supposing two orders to have been prepared by as many salesmen, and that one order has just been filled. Suppose the last coins of this order to have been ejected by a final swing of the motor frame forward, by which is meant, toward the operating shafts 21, 22 and 23. The order being complete, but the change maker motor 110 not yet disconnected, the motor frame swings backward, or away from the operating shafts. The pin 25 is so set on the disk 24 and shaft 21 (see Figs. 3 and 7) that, just at the end of this backward swing of the motor frame, the shaft 22 is revolved through its proper angle. (In the form shown, sixty degrees.) This brings the cams 42 into such a position that the restoring bar is raised to its highest point, and thus all the slide bars 5 are removed from possibility of engagement with the bar 30 of the motor frame as it again swings forward for the second time. This position of the cams is that shown in Fig. 3, and that figure makes it clear that it is at this time that pin 170 is in a horizontal, or operative position. Consequently, when the motor frame thus swings forward in completing its first vibration, (counting from the moment when the last coin is ejected in the previous order) the position shown in Fig. 35 is reached and switch 156 is closed. As heretofore described, this results in an operation of the appropriate maintaining magnet, 103 (see Fig. 18 and 17) and the prime mover 110 is now fed by current closed at two points 109; one of these belonging to the old order, filled, but not yet started away, the other belonging to the new order, about to be filled. The second full vibration of the motor frame now commences, and Fig. 3 shows the device at the moment when the motor frame is half way on its backward movement in this vibration. Just as the motor frame reaches its extreme backward position, the shaft 22 is again moved by pin 25, and the cams 42 assume the position shown in Fig. 7; whereby the restoring bar is brought to its lowest point. The projection 171 comes at the same time into operative position (see Fig. 35) and the motor frame swings forward once more, closing switch 165 against said projection 171, at the end of its second double vibration. This as before described, results in dropping the record bar 52 onto the record hook 66, by closure of the circuit through magnet 54, and also by closure of circuits through the money magnets, drops the proper drop bars 6. So far switches 72, 77 and 79 have been traversed by currents named, and they may appropriately be turned to prepare for the next order, and to bring switch 78 into such a position as to start the car for the old order. Accordingly, just as the motor frame completes its backward movement on the first half of the third vibration, the consequent movement of shaft 22 produces movement of shaft 23 by means of the gearing shown in Fig. 4, and, by the instrumentalities shown in Figs. 10, 11 and 17, the change distributer 81 is turned for the new order, the old maintaining switch is restored by means of the proper projection 112, and the proper car is started for the old order, by a circuit closed through 111, 113 and switch 78 in its new position. The other switches 72, 77 and 79 of the order selector are now ready for an order subsequent to that about to be filled. It will thus be seen that no change is distributed on a new order until the order selector switches 72, 77 and 79 are set for a subsequent order, and the switch 78 is set to start the car for the order already filled. Thus 78 is in one sense always two orders behind the other switches of the order selector. As above stated, this change in position of order selector, maintaining magnet, car starter and change distributer takes place just as the bar 30 reaches its extreme backward position half way through the third vibration. The drop bars having been previously depressed, and the last movement of the shaft 22 having produced no effect on the restoring bar, as heretofore described, the completion of this third vibration pulls the proper slide bars forward, and the first instalment of change is expelled. The rest of the operation, wherein the restoring bar comes into play has already been described.

The above arrangement and sequence of movements involves two complete vibrations of the motor frame between expelling the last coin on the old order and beginning to expel coins for the new order. This is done in order to fit the action of the two magnets used in my specific form of order setting device which latter is calculated to secure certainty of action in the money magnets. The use of these two movements is also useful in insuring the passage of all the coins of the old order into their car, before the distributing chute is moved. It is to be understood that my invention is not confined to the number of movements or their sequence exactly as above described.

It will be further seen that my invention is adapted to be used simply as a recorder, for the sole purpose of book keeping, either with or without the cash carrier. It may appropriately be used in this way where salesmen are given charge of money, and I have claimed the invention so broadly as to cover this combination.

In this application I have restricted my claims to the change maker and such parts as are closely related thereto whether the same is used in store service for supplying a plurality of salesman's stations or whether used in any other desired way. The other features above described are claimed in Patent No. 758,060, of which this application is a division.

What I claim is—

1. The combination of a change maker and a motor mechanism therefor, with a change recorder and order setting device.

2. In a change maker, a change deliverer, motor mechanism therefor, and a change selector movable independently of said motor mechanism and adapted to establish various connections between said change deliverer and motor mechanism.

3. In a change maker, a change deliverer, motor mechanism therefor, a recorder adapted to be variously connected for operation with said motor mechanism and a change selector adapted to establish various connections between said motor mechanism and said deliverer and recorder.

4. In a change maker, a change deliverer and motor mechanism therefor; said mechanism being adapted to make a number of strokes in each operation of the machine; in combination with a change selector adapted to control the change deliverer with relation to the number of strokes of said motor mechanism which may act upon said deliverer in one operation of the machine.

5. In a change maker, a change selector, a type selector, and means whereby the change selector operates the type selector.

6. In a change maker, a change selector, a selecting operator and operative connections between the two; in combination with a change deliverer and motor mechanism therefor, movable independently of said selecting operator.

7. A change deliverer and motor mechanism therefor; in combination with a change selector, a type selector and operative connections between the two.

8. A change selector and selecting operator in combination with an order setting device.

9. A type selector and selecting operator; in combination with an order setting device and motor mechanism for the type selector.

10. In a change maker and recorder, a change selector, a type selector, a printing mechanism, a motor mechanism, and means for bringing said motor mechanism into operative relation with said printing mechanism.

11. A recording device, a motor therefor, a motor maintaining magnet and a temporary circuit closer for closing circuit through said magnet; in combination with a magnetic releaser for said recording device, a temporary circuit closer for closing a circuit through said magnetic releaser and means for preparing circuits for closure by said temporary circuit closers.

12. In a change maker, a motor therefor, a motor maintaining magnet and a temporary circuit closer for closing the circuit through said magnet; in combination with a series of money magnets a change selector operated thereby, a temporary circuit closer for closing a circuit through said money magnets and means for preparing circuits for closure by said temporary circuit closers.

13. In an order setting device, a magnet, means for partly closing the circuit therethrough at a distance from the point where the order is rendered effective, further means for completing the closure of said circuit at the point where the order is rendered effective, and a circuit closer operated by said magnet; in combination with a second magnet energized by operation of said circuit closers, and acting to open the energizing circuit of said first magnet.

14. In a change maker motor mechanism, a motor shaft, a restoring shaft operated thereby and a selecting shaft operated by the restoring shaft.

15. In a change maker, three rotary shafts, gearing whereby the speed of said shafts is rendered successively slower, a change deliverer and means for operating the same driven directly by the fastest of the three shafts, a change selecting device and restoring mechanism therefor driven directly by the next slower shaft and an order selector driven directly by the slowest shaft.

16. In a recorder for change maker, a printing mechanism, a motor mechanism and a record bar adapted to engage with said motor mechanism when allowed to drop; in combination with a magnet and an armature controlled thereby for supporting said record bar out of operative position.

17. In a change maker, a change deliverer comprising a series of slide bars capable of being raised or depressed, a motor mechanism adapted to make repeated engagement with said slide bars when they are depressed, and means for raising and depressing said slide bars.

18. In a change maker, a change delivering device adapted to be brought into operative position when lowered; in combination with a lifting bar for supporting said change delivering device, a normally elevated drop bar making frictional engagement with said lifting bar and means for depressing said drop bar.

19. In a change selector, a drop bar, a support therefor and a push bar for pushing said drop bar off of its support.

20. In a change selector, a drop bar, a support therefor, a shoulder on the bar engaging said support and a push lever adapted to push said shoulder off said support and to catch under said shoulder.

21. In a change selector, a drop bar, a shoulder thereon and a support for said shoulder; in combination with an inclined replacing spring so attached as to pull said drop bar over onto said support when the bar is raised.

22. A change selector comprising a series of drop bars having a supporting shoulder and a restoring shoulder; in combination with a restoring device comprising a swinging restoring bar and a lifting cam coöperating therewith.

23. In a change maker, a drop bar having a shoulder and an operating push bar therefor; in combination with means whereby the push bar operates the drop bar, said means comprising a pivoted sleeve carrying two arms, one of said arms adapted to engage with the operating push bar, and the other arm adapted to engage with the drop bar and to catch under the shoulder thereof.

24. A change maker comprising a series of coin reservoirs, a separate means for expelling coins one at a time from each reservoir, a common motive device for all of said expelling means and means for causing separate operative connection at will between each expelling device and said common motive device during one or more operations of the latter, substantially as described.

25. In a change maker, the combination of a money tube adapted to contain a plurality of money units of any denomination, a money ejector adapted to eject one unit at each stroke, automatic mechanism for imparting one or more strokes to the ejector, and means under the control of the operator for predetermining the number of strokes of said ejector, whereby one or more units of money, as desired, may be automatically ejected, one by one, by a single operation of the machine.

EDWIN R. GILL.

Witnesses:
H. S. MacKaye,
Florence Peck.